(12) United States Patent
Olkin et al.

(10) Patent No.: US 7,325,127 B2
(45) Date of Patent: *Jan. 29, 2008

(54) SECURITY SERVER SYSTEM

(75) Inventors: Terry M. Olkin, Los Gatos, CA (US); Jahanshah Moreh, Los Angeles, CA (US)

(73) Assignee: Secure Data In Motion, Inc., San Mateo, CA (US)

( * ) Notice: Subject to any disclaimer, the term of this patent is extended or adjusted under 35 U.S.C. 154(b) by 820 days.

This patent is subject to a terminal disclaimer.

(21) Appl. No.: 10/305,726

(22) Filed: Nov. 26, 2002

(65) Prior Publication Data

US 2003/0074552 A1    Apr. 17, 2003

Related U.S. Application Data

(63) Continuation-in-part of application No. 09/558,691, filed on Apr. 25, 2000, now Pat. No. 6,584,564.

(51) Int. Cl.
    *H04L 9/00*  (2006.01)
(52) U.S. Cl. .................................... 713/152; 713/160
(58) Field of Classification Search ................ None
    See application file for complete search history.

(56) References Cited

U.S. PATENT DOCUMENTS

| | | | |
|---|---|---|---|
| 4,897,875 A | 1/1990 | Pollard et al. | 380/23 |
| 5,200,999 A | 4/1993 | Matyas et al. | 380/25 |
| 5,748,735 A | 5/1998 | Ganesan | 380/21 |
| 5,841,865 A | 11/1998 | Sudia | 380/21 |
| 5,848,161 A | 12/1998 | Luneau et al. | 380/49 |
| 5,864,667 A | 1/1999 | Barkan | 395/187.01 |
| 6,009,173 A * | 12/1999 | Sumner | 713/156 |
| 6,023,700 A | 2/2000 | Owens et al. | 707/10 |
| 6,055,314 A | 4/2000 | Spies et al. | 380/21 |
| 6,230,156 B1 | 5/2001 | Hussey | 707/10 |
| 6,289,105 B1 | 9/2001 | Murota | 380/286 |
| 6,442,686 B1 | 8/2002 | McArdle et al. | 713/151 |
| 6,760,752 B1 * | 7/2004 | Liu et al. | 709/206 |
| 6,944,762 B1 * | 9/2005 | Garrison | 713/160 |
| 7,065,547 B2 * | 6/2006 | Persels et al. | 709/200 |
| 2003/0147536 A1 | 8/2003 | Andivahis et al. | 380/277 |

OTHER PUBLICATIONS

Australian Patent Office, Written Opinion (second), App. No. SG 200503239-6, Date of mailing Jan. 17, 2007 [a report prepared for and communicated to the Singapore Registry of Patents and ultimately received by Applicant on Feb. 27, 2007].

* cited by examiner

*Primary Examiner*—Nasser Moazzami
*Assistant Examiner*—Pramila Parthasarathy
(74) *Attorney, Agent, or Firm*—Raymond E. Roberts; Patent Venture Group

(57) ABSTRACT

A security server system and method permitting participants acting as the source or destinations for a message or a conversation with multiple messages to securely communicate the messages. The messages have a message header and a message content. A message router connects the participants via a network and delivers the message between the participants based on the message header. A key server creates, stores, and releases conversation keys that the participants use to protect the message content of the message.

28 Claims, 11 Drawing Sheets

FIG. 6a: Basic user information table (Users)

| Column Name | Type | Description |
|---|---|---|
| UserId | integer | Internal user identifier |
| Password | raw | Hash of user's password |
| Salt | integer | Salt added to password before hash |
| Status | varchar | User's current registration/usage status |

FIG. 6b: Sent messages table (SentMail)

| Column Name | Type | Description |
|---|---|---|
| MessageId | integer | Unique email identifier |
| SenderId | integer | Internal sender identifier (ref to Users) |
| DateSent | date | Time and date record entered |
| NumRecipients | integer | Number of users message was sent to |
| MessageKey | raw | Key used to encrypt/decrypt message |
| MaxDeliveries | integer | Maximum times key is delivered to each user |
| Expiration | date | Time after which message should not be delivered |
| SealSalt | integer | Secret salt added to hash to form seal |
| Subject | varchar | The subject of the message |
| LastRead | date | The date the message was last read |
| DeliverAfter | date | The date after which the message may be read |

FIG. 6c: Email destinations (Receivers)

| Column Name | Type | Description |
|---|---|---|
| MessageId | integer | Email message's identifier (ref to SentMail) |
| ReceiverAddr | integer | Receiver's e-mail address |
| FirstRequest | date | Time the receiver first attempts to read |
| NumRequests | integer | Number of times receiver requested to read |

FIG. 6d: Alternate user identities (UserAliases)

| Column Name | Type | Description |
| --- | --- | --- |
| EmailAddress | varchar | Alternate email address |
| UserId | integer | Reference to Users table. |

FIG. 6e: Distribution list master (Distributions)

| Column Name | Type | Description |
| --- | --- | --- |
| DistributionId | integer | Unique list identifier |
| OwnerId | integer | User who owns list (ref to Users). |
| ListName | varchar | Email address of this list |

FIG. 6f: Distribution list members (ListMembers)

| Column Name | Type | Description |
| --- | --- | --- |
| DistributionId | integer | Reference to Distributions |
| MemberAddress | varchar | Name of alias on the list |
| Administrate | char | Y=member can update list, N=cannot |

SECURITY SERVER SYSTEM

CROSS-REFERENCE TO RELATED APPLICATIONS

This is a continuation-in-part of application Ser. No. 09/558,691, filed Apr. 25, 2000 now U.S. Pat No. 6,584,564.

TECHNICAL FIELD

The present invention relates generally to providing security for messages communicated in networks, including the Internet.

BACKGROUND ART

Virtually every user of electronic communications mediums has at some time or another paused to wonder about the security of communications within those systems. Various reasons exist for concern in this regard, probably ones far too numerous to cover here, but a few examples include having to depend on complex technologies, having to rely on unknown and possibly untrustworthy intermediaries, and the increasing anonymity in our electronic networks due to the distances which communications may travel and the masses of people which we may now reach.

Existing communications systems have had a long time to establish security mechanisms and to build up trust in them by their users. In the United States our conventional postal mail is a good example. We deposit our posted letters into a receptacle which is often very physically secure. Our letters are then picked up, sorted, transported, and ultimately delivered to a similar receptacle for retrieval by their recipients. Between the receptacles of a sender and a receiver the persons handling a letter are part of a single organization (at least intra-nationally) that is well known to us and considered to be highly trustworthy. Even on the rare occasions when the security of our postal system does fail, it has mechanisms to quickly detect and to correct this.

Unfortunately, most of us do not have anywhere near a similar degree of trust in the security of electronic communications as they pass between senders and receivers in our modern networks. We generally trust only in our ability to maintain the security of our sending and receiving "receptacles" for messages, such as e-mail, instant messages, video-conferences, collaborative documents, etc. This is because these receptacles are personal computers (PCs), workstations, Internet appliances, etc. that are within our personal physical control. We also typically appreciate that we have much less control over what goes on in the electronic medium between such receptacles. For instance, potentially any number of miscreants might copy and receive an unsecured message without its sender and intended receivers being any the wiser. Even worse, in many cases, electronic communications can be maliciously altered in transit, fraudulently concocted entirely, or later simply repudiated.

The problem of e-message security is severe and is already receiving considerable attention. Legal mechanisms have already been put into place, and stronger ones continue to be put into place, at least for e-mail messages, to punish and to discourage security breaches. However, the very beneficial ability of electronic messages to travel so far and so swiftly as they can also means that they may cross legal boundaries, potentially hampering such legal efforts and definitely creating a crisis in user confidence.

Old technologies have been revived and extended for use in the new electronic medium, and often these are variations of ones long used in combination with conventional postal systems to obtain heightened security there. Thus we are seeing a resurgence of interest in and the use of cryptography.

Many of the existing systems for securing electronic communications are unwieldy, not well trusted, or both. The very electronic systems which have made modern electronic communications possible and efficient have already made many conventional cryptographic systems obsolete, or at least highly suspect. Equally our more modern computer systems have the ability to perform staggering numbers of tedious operations in a massively parallel manner, and many strong cryptographic systems of the past have now been shown to be no longer reliable.

New systems for securing electronic communications have emerged, however. The last 25 years have seen the introduction, rapid development, and more recently the application of public-key and private-key based systems commonly termed a "public key infrastructure" (PKI). These are presently quite popular, but perhaps prematurely and unduly.

The foundation of the PKI system is generally attributed to work done by Ron Rivest, Adi Shamir, and Leonard Adleman at the Massachusetts Institute of Technology in the mid 1970's. The result of that work, commonly known as the RSA algorithm, is a cryptosystem wherein both a public and a private key are assigned to a principal. The public key is revealed to all, but the private key is kept secret. The keys used are both large prime numbers, often hundreds of digits long, and the inherent strength of the RSA algorithm lies in the difficulty in mathematically factoring large numbers.

To send a message securely the message is encrypted using the public key of its intended recipient (here the principal). The message can then only be decrypted and read by the recipient by using their private key. In this simple scenario anyone can send messages to the recipient which only the recipient can read.

A highly beneficial feature of the PKI approach is that a sender can also be a principal and can send a message which only they could have sent. i.e., a non-repudiable message. For this the sender encrypts a message (often only a part of what will be a larger message) using their private key. A recipient then knows that the purported or disputed sender is the true sender of the message, since only using that sender's public key will work to decrypt the message.

In practice, the sender and the receiver often are both principals in PKI systems. The sender encrypts a "signature" using their private key, then embeds this signature into their message, and then encrypts the result using the recipient's public key. The message then is secure from all but the recipient. Only the recipient can decrypt the message generally, using their private key, and once that is done the recipient may further use the sender's public key to specifically decrypt the signature. In this manner the receiver may rest assured that the sender is the true, non-repudiable, source of the signature (and implicitly the entire message; but this works more securely still if the signature uniquely includes something like a hash of the general message).

As the presence of the term "infrastructure" in PKI implies, however, this popular cryptographic system requires a considerable support system. The public keys must also be published, so that those wishing to send a message can determine keys for the intended message recipients. Additionally, public keys are certified for a specific period of time (e.g., one year) and must be renewed.

Finally, if the private key is compromised or suspected as having been compromised, the corresponding public key must be revoked. Consequently, any communicating party must check the revocation status of a public key before using it to encrypt messages or verify signatures. These tasks are usually handled by a "certification authority." Unfortunately, as the marketplace in our competitive society is now demonstrating, this can lead to a plurality of certification authorities all vying for acceptance and thoroughly confusing the potential users. Moreover, the lifecycle of public keys (creation, distribution, renewal, and revocation) can lead to complex and unmanageable deployment scenarios.

Of course public and private key systems are possible without the use of a certification authority, say, among small groups wishing to carry out secure communications among themselves and where repudiation is not a concern. But as the very negative reaction by our government to initial publication of and about the RSA algorithm aptly demonstrated, true, unbridled security can be perceived as a threat to a government's ability to protect society. While it is probably now too late for most governments to fully suppress the use of ultra-strong cryptography, it also follows that such governments will be more receptive to cryptosystems that can be opened when truly appropriate (often termed "key escrow" systems).

PKI also has some problems with regard to usability and efficiency. Since the keys are quite large, usually well beyond the capability of an average human to memorize, they are awkward to work with. Machine based storage and usage mechanisms usually must be employed just to handle the keys. This is a severe impediment to mobile use across multiple systems and to recovery after erasure from volatile memory, and it creates a whole host of additional problems related to protecting what effectively becomes a physical key needed to contain the private key. A receiver based key system, such as PKI, is also unwieldy in some situations. For example, if there are multiple intended recipients, a public key for each must be obtained and used to separately encrypt each message copy. This can encompass quite a severe computational burden as a list of intended message recipients grows in number. Accordingly, the common case in actual practice is that the message is first encrypted with a single symmetric key. The message key is then encrypted multiple times using each recipient's public key. Thus, the message itself is only encrypted once. It is the message key that is encrypted multiple times.

Accordingly, electronic message systems that employ prior art cryptosystems and PKI systems provide many benefits, but even they are not perfect in all regards. It is increasingly becoming apparent that it is now desirable to improve on, augment, or even replace such systems.

DISCLOSURE OF INVENTION

Accordingly, it is an object of the present invention to provide security for messages communicated in networks such as the Internet.

Briefly one preferred embodiment of the present invention is a system for securely communicating a message between multiple participants when the message has a message header and a message content. In this system, a message router connects the participants via a network and delivers the message between the participants based on the message header. A key server creates, stores, and releases conversation keys to the participants, wherein the conversation keys are used to encrypt or decrypt the message content of the message.

Briefly another preferred embodiment of the present invention is a method for securely communicating a message between multiple participants in a network. The participant sending the message is a source participant and the participants receiving the message are destination participants. The message has a message header and a message content. In this method, the source participant obtains a conversation key from a key server also in the network. The source participant then encrypts the message content of the message based on the conversation key. And the source participant sends the message to the destination participants via the network. The destination participants then receive the message from the source participant via the network. The destination participants obtain the conversation key from said key server. And finally, the destination participants decrypt the message content of the message based on the conversation key.

An advantage of the present invention is that it provides for highly secure message communications. The invention protects messages between senders and receivers, or collaboration participants, by using a robust key management technique. It further permits a high degree of message tamper detection and message non-repudiation by senders. The invention, however, provides all of its function without ever needing to inspect the actual secured content of messages.

Another advantage of the invention is that it minimally burdens those using it. It does not require complicated installation and configuration by its users, being either pre-installed or rapidly user-installable with defaults provided for all configuration options. In particular, the invention is easily implemented by enterprises and other organizations to protect member's messages and to facilitate collaborative work.

Another advantage of the invention is that it may employ a simple registration scheme which permits prompt use after registration and any installation are complete. Because of these and other features, the target recipients of secure messages created using the invention need not be preregistered. A sender may create and send a secure message, and the invention can then detect which intended receivers are not registered and facilitate registration.

Another advantage of the invention is that its core functionality does not rely on public-private key encryption schemes, although such may be incorporated in some elements of the invention to make it convenient and also more secure in some ancillary respects.

Another advantage of the invention is that, unlike a public/private key system, the key to the message need not be encrypted once for every recipient. Similarly, the secured content of the messages is not decrypted once for every recipient when messages pass through routers and hubs. Thus, the number of encryptions and decryptions performed are independent of the number of receivers and of the resources used for communications.

Another advantage of this invention is that, unlike public/private key system, it is not dependent on the location where the private key resides. A user can, from any location, participate in a secure collaboration with other parties.

And, another advantage of the invention is that, it particularly facilitates secure collaborative communications. It can secure conversation for large groups of senders and receivers, or collaboration participants, and it can easily change security whenever a new user joins or an existing user leaves a conversation, thereby implementing backward and forward secrecy of the conversation.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 2a-c depict e-mail forms which may be used by the embodiment of the invention in FIG. 1, wherein FIG. 2a is a conventional send form, FIG. 2b is a send form which is modified to work with the invention, and FIG. 2c is a conventional receive form;

FIG. 6a-e are the tables in FIG. 5 with descriptions for the fields used therein, wherein FIG. 6a is of user data, FIG. 6b is of message data, FIG. 6c is of destination data, FIG. 6d is of alias data for users, FIG. 6e is of optional distribution list data, and FIG. 6f is of member data for such distribution lists;

BEST MODE FOR CARRYING OUT THE INVENTION

Figure 1:
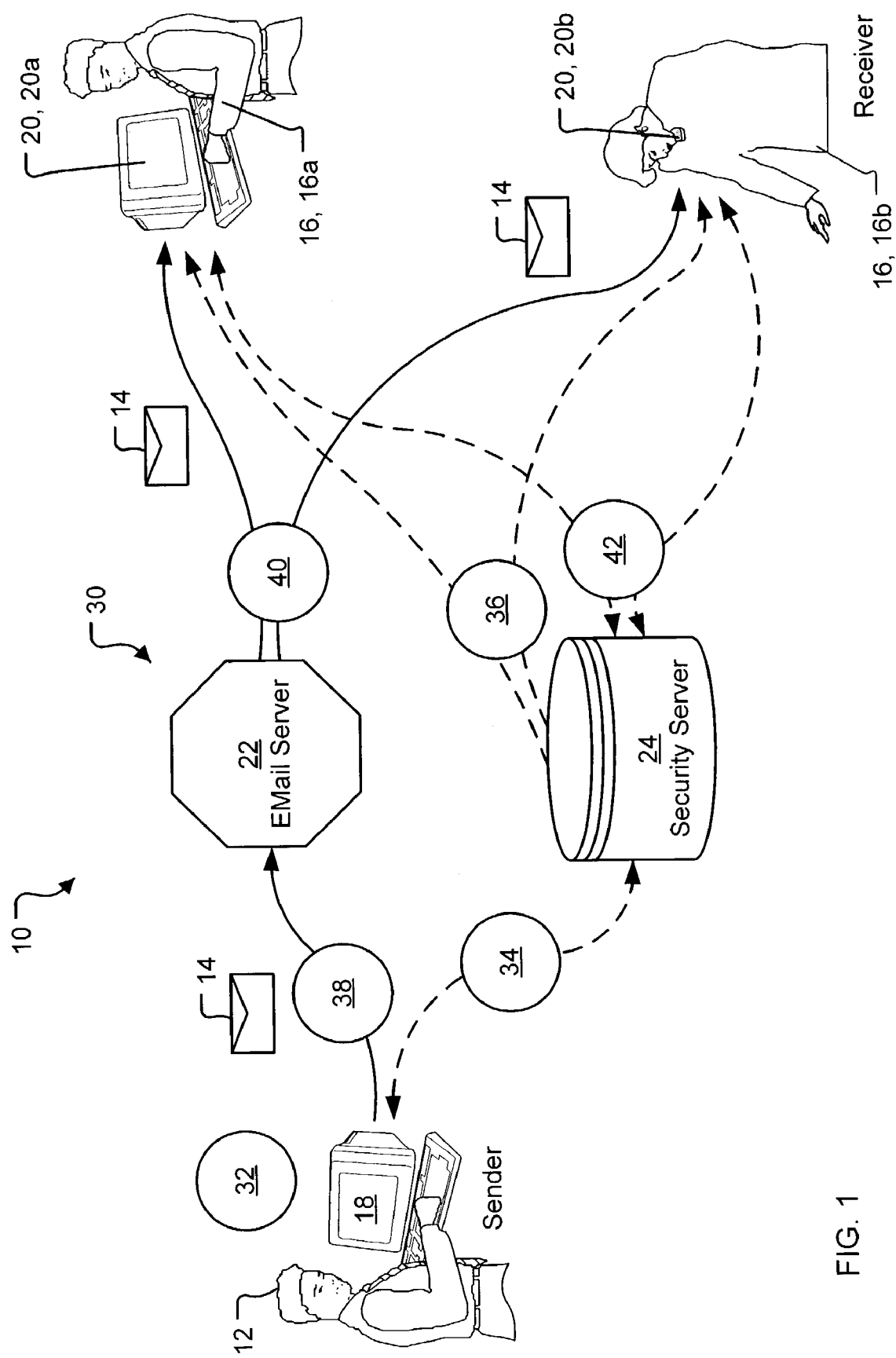
FIG. 1 is a schematic overview diagram generally depicting information flow according to the present invention in the context of an example secure e-mail system.

A preferred embodiment of the present invention is a system for key exchange and secure collaborative communication based thereon. As illustrated in the various drawings herein, and particularly in the views of FIGS. 1 and 9, preferred embodiments of the invention are depicted by the general reference characters 10 and 210.

FIG. 1 is a schematic overview diagram generally depicting information flow in a secure e-mail system 10 in accord with the present invention. A sender 12 uses the secure e-mail system 10 to send a secure e-mail 14 to one or more receivers 16. To accomplish this the sender 12 employs a suitable sending unit 18 to create and send the secure e-mail 14, and the receivers 16 then employ suitable receiving units 20 to receive and view the secure e-mail 14. The secure e-mail system 10 further includes an e-mail server 22, which is essentially conventional, and a security server 24 (a form of key server, as discussed presently), that along with software modules 26 (FIG. 3) in the sending units 18 and the receiving units 20 constitute the primary new elements in the secure e-mail system 10.

The sending units 18 and the receiving units 20 are suitable combinations of hardware and software. They may be either similar or different hardware, and in FIG. 1 this is emphasized by depicting the sending unit 18 and a first receiving unit 20a as being personal computers (PCs), and the second receiving unit 20b as being an Internet appliance.

The sending unit 18 must have sending capability, and in many cases it will also be utilized to compose the secure e-mail 14. However, composition capability is not necessarily a requirement and, for example, an Internet appliance such as a cell-phone with pre-stored standard messages may also be used. The receiving units 20 must be capable of receiving the secure e-mail 14 and they may, optionally, also have message composition and other capabilities.

With respect to the software required, each sending unit 18 and receiving unit 20 will need suitable e-mail type applications and suitable instances of the software modules 26. The e-mail type applications may be conventional e-mail applications, or they may be browsers having integrated e-mail capability, or they may be e-mail applets operating in conventional browsers. The software modules 26 will be described in more detail presently, but it can be noted here that these can be installed almost contemporaneously with their first use in a sending unit 18 or a receiving unit 20.

In FIG. 1 both a first receiver 16a and a second receiver 16b are depicted to emphasize that the secure e-mail system 10 may be used to send to multiple receivers 16. Thus, common e-mail addressing conventions such as "To . . . ," "Cc . . . ," "Bcc . . . ," etc. may be used, and the secure e-mail system 10 may also be used to concurrently send to lists of multiple receivers 16.

For the following overview discussion it is presumed that the sender 12 and the first receiver 16a are registered within the secure e-mail system 10 and that the sending unit 18 and the first receiving unit 20a have been suitably provisioned with appropriate instances of the software modules 26 to operate in their respective roles in the secure e-mail system 10. It is further presumed that the second receiver 16b has not yet registered within the secure e-mail system 10 and that the second receiving unit 20b has not yet been provisioned to operate with the secure e-mail system 10.

The overview of FIG. 1 also depicts the major stages of sending a secure e-mail 14 in a network environment 30, such as the current Internet. In a stage 32 the sender 12 decides to send the secure e-mail 14. An e-mail message is therefore composed in some manner, conventional or otherwise.

In a stage 34, rather than use a "Send" command the sender 12 instead uses a "Send Securely" command to request transmission of the secure e-mail 14. However, rather than transmit the unsecured e-mail message immediately to the e-mail server 22, the sending unit 18 first contacts the security server 24 and provides it with various data items (the respective data items used in this stage and others are described presently). The security server 24 then authenticates the sender 12 and replies to the sending unit 18 with a unique message key and id for the present secure e-mail 14. The security server 24 also logs various data items for this transaction which may be used later. Using the message key, the sending unit 18 now encrypts the secure e-mail 14. The message body, encrypted or otherwise, is never sent to the security server 24.

In a stage 36 the security server 24 determines whether the receivers 16 are registered. If so, as is the case here only for the first receiver 16a, this stage is finished for such receivers 16. However, if a receiver 16 is not registered, as is the case here for the second receiver 16b, registration is then attempted. For this the security server 24 sends an e-mail message to the second receiver 16b, informing him or her that an encrypted message will be arriving soon and that he or she will need to register in order to read it. The second receiver 16b can then follow a universal resource locator (URL), which is included in the e-mail sent by the security server 24, to a routine for registering with the security server 24. The second receiving unit 20b may already have the necessary software module 26 for receiving and decrypting the secure e-mail 14, or such may be provided as part of the registration process. Once the second receiver 16b is registered and the second receiving unit 20b has the necessary software module 26 installed, this stage is complete.

Alternately, stage 36 can be skipped in the secure e-mail system 10. The secure e-mail 14 can itself include a universal resource locator (URL), in plain form, that the receivers 16 can follow. The security server 24 thus need not be concerned with whether the receivers 16 are registered. The sender 12 can prepare and send the secure e-mail 14, as already described, and the receivers 16 can deal with whether or not they are registered and can read the secure e-mail 14 upon its arrival.

In a stage 38 the sending unit 18 sends the now encrypted secure e-mail 14. This can be essentially transparent or seamless to the sender 12, being handled in the software module 26 of the sending unit 18 by passing the now encrypted secure e-mail 14 to a conventional e-mail type application and automatically providing a suitable "Send" command. The secure e-mail 14 then proceeds in conventional manner to the e-mail server 22, arriving in the inbox of each of the target receivers 16. Notably, the body of the secure e-mail 14 is encrypted during the entire time that it is passing between the sending unit 18 and the receiving units 20. Optionally, the subject may also be encrypted during this time.

In a stage 40 the secure e-mail 14 arrives in the inbox of each receiver 16. When a receiver 16 opens the secure e-mail 14, using their receiving unit 20, the software module 26 for the receiving unit 20 detects that the secure e-mail 14 is encrypted. Depending upon its configuration, the software module 26 can then prompt the receiver 16 for a password or use one already known to it.

Finally, in a stage 42 the receiving unit 20 contacts the security server 24 and provides it with the message id and data for the receiver 16 (including their password). Assuming that the receiver 16 is an authorized recipient (as determined by the list of recipients in the original message), the security server 24 provides the message key to the receiving unit 20. Optionally, the security server 24 can also provide an indication of whether the secure e-mail 14 was altered in any way. With the message key the receiving unit 20 decrypts the secure e-mail 14 and the receiver 16 is able to read it.

Figure 2A:
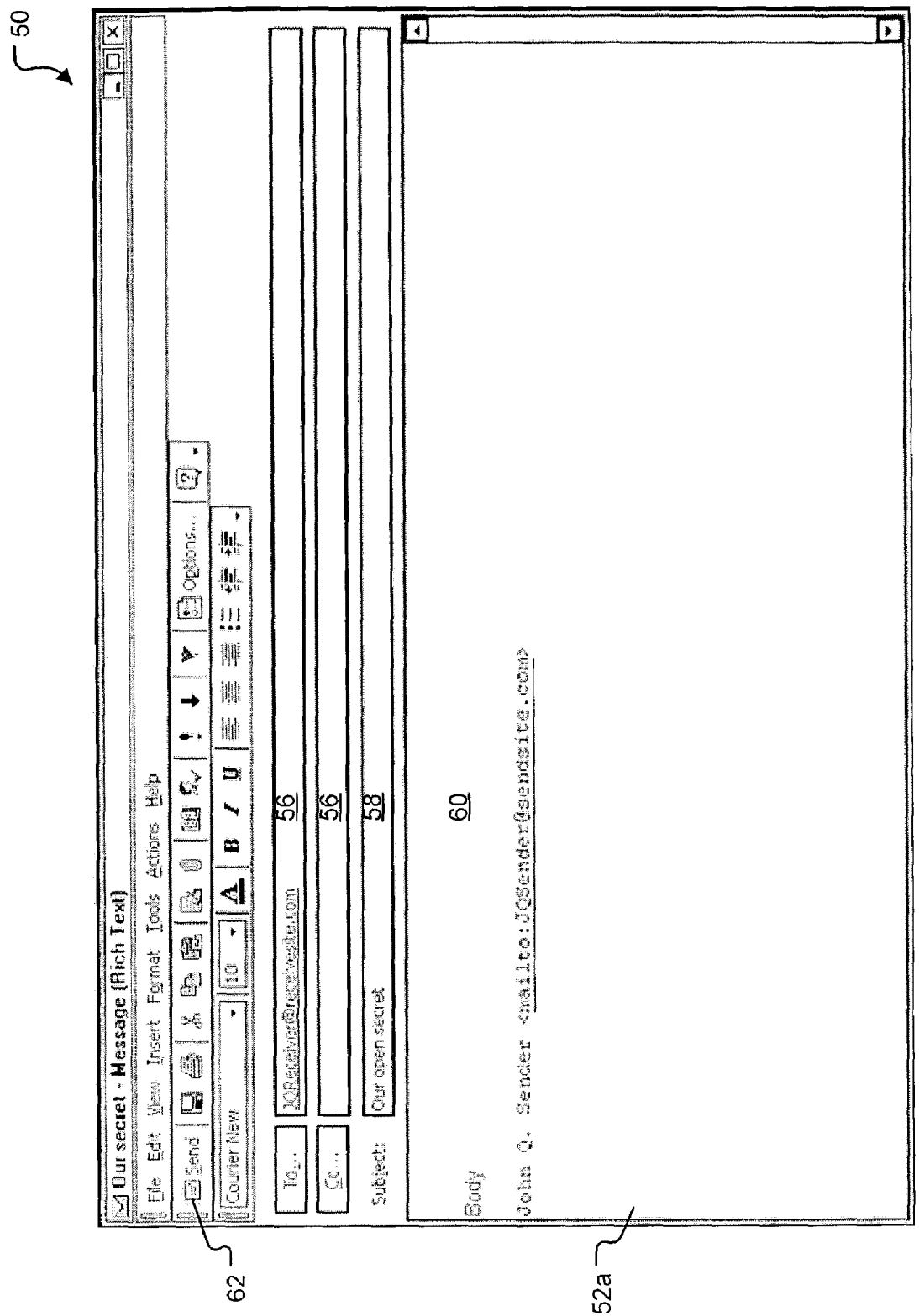
Figure 2B:
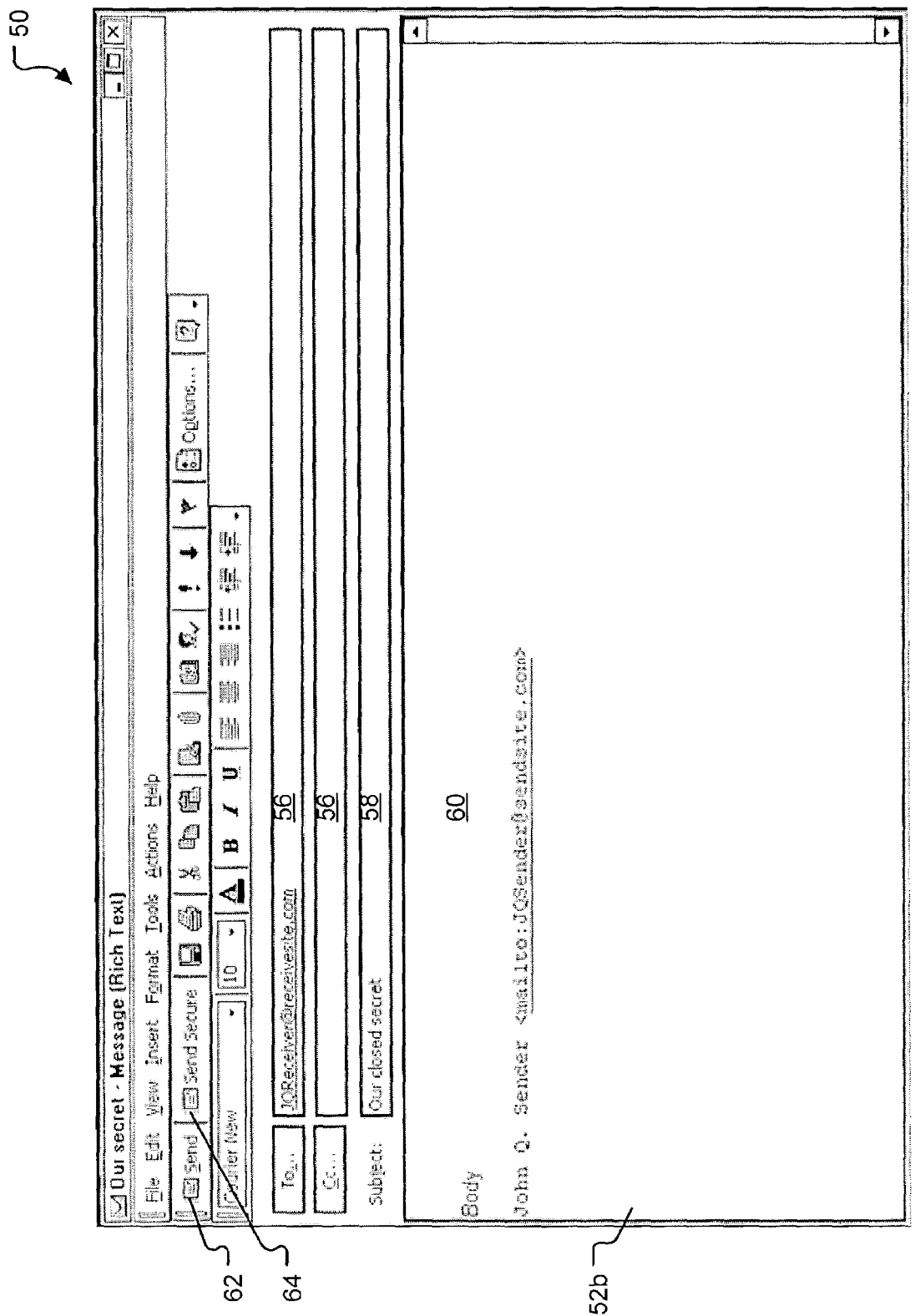
Figure 2C:
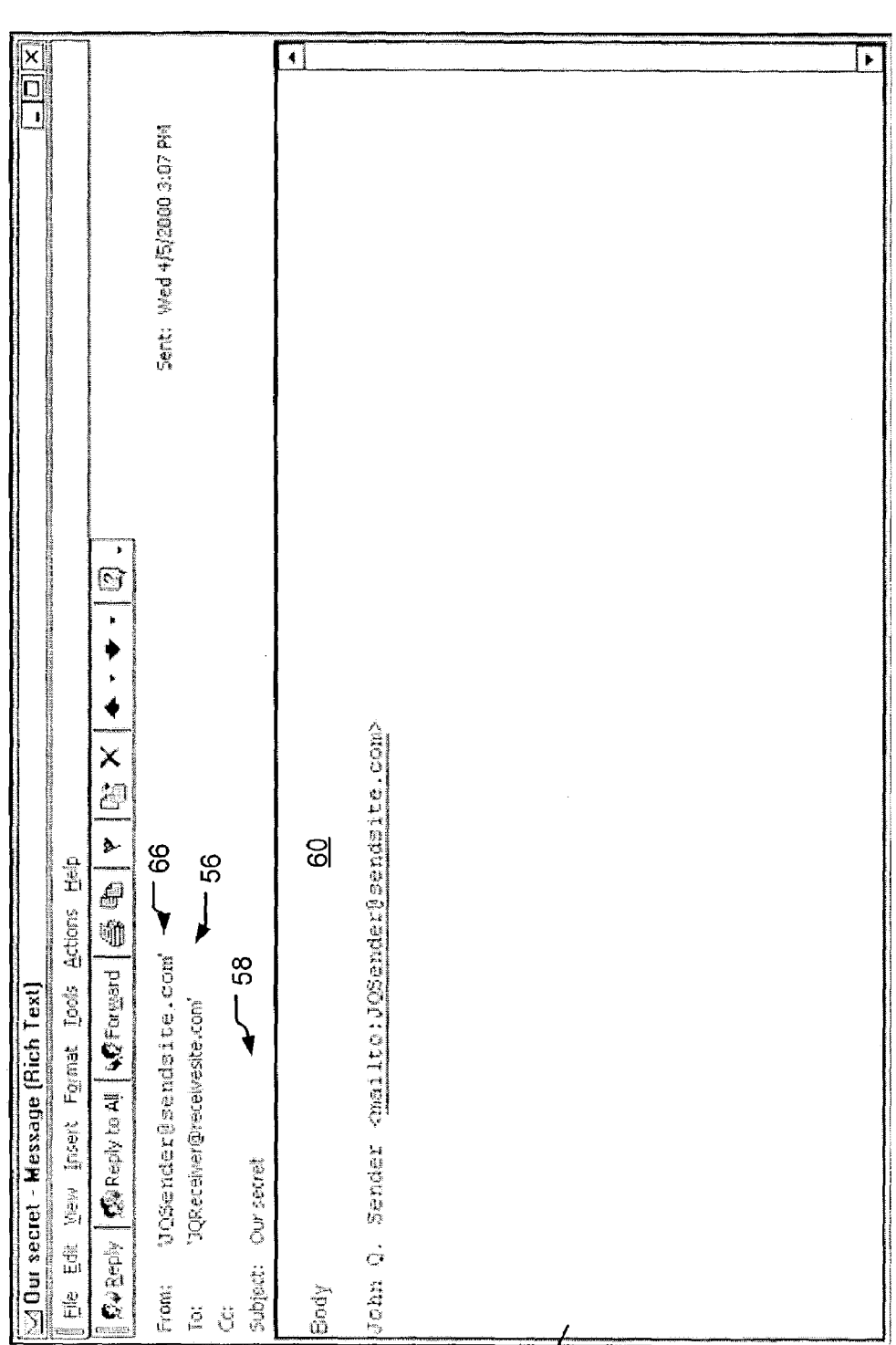

FIG. 2a-c depict e-mail forms 50 which the secure e-mail system 10 may use. FIG. 2a is a conventional send form 52a. FIG. 2b is a send form 52b that is essentially the same as send form 52a, but that is modified to work with the secure e-mail system 10. And FIG. 2c is a conventional receive form 54 that can be used with the secure e-mail system 10.

The send forms 52a-b both include receiver id fields 56, subject fields 58, and body fields 60. They also both include a conventional send button 62. The only difference between the send form 52a of FIG. 2a (conventional) and the send form 52b of FIG. 2b (modified) is that the latter also includes a send securely button 64. While it may be desirable in some embodiments to entirely replace the send button 62 with the send securely button 64, that is not anticipated to become common. The receive form 54 of FIG. 2c includes receiver id fields 56 (To: and Cc:), a subject field 58, a body field 60, and also a sender id field 66. Understanding the various fields in these forms will be helpful for the following discussion.

Figure 3:
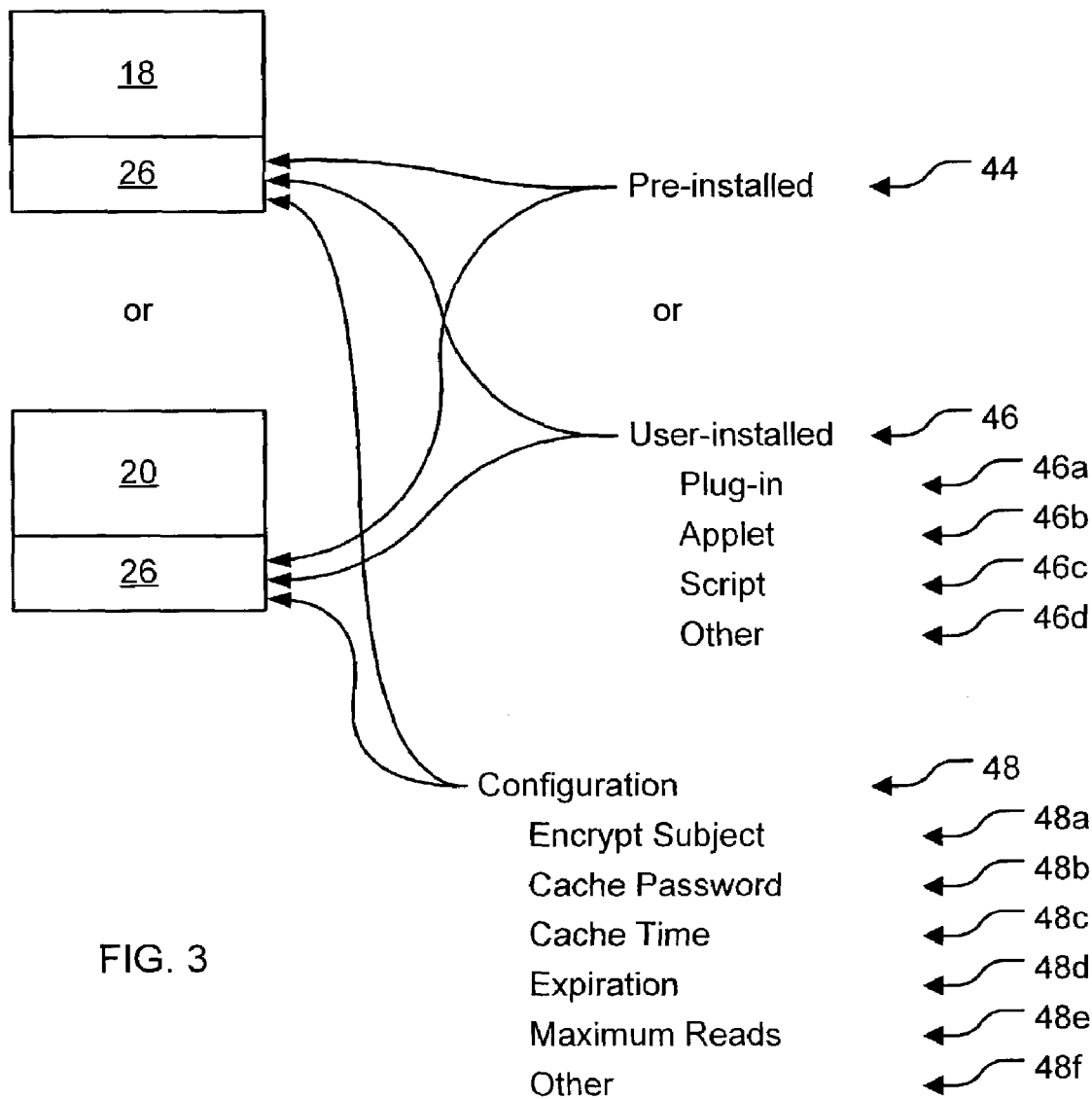
FIG. 3 is a block diagram depicting software modules which may be used in the sending and receiving units of FIG. 1.

FIG. 3 is a block diagram depicting the software modules 26 used in the sending unit 18 and receiving unit 20. In many embodiments of the invention the software modules 26 can be the same in both the sending unit 18 and the receiving unit 20, but this is not a requirement and different modules may also be used. The software modules 26 can be viewed as "client" side components of the secure e-mail system 10.

This figure also depicts various possible manners of installing the software modules 26 into the sending units 18 and receiving units 20. A pre-installed option 44 may be used whereby the underlying e-mail type application which is loaded onto a sending unit 18 or a receiving unit 20 comes with the software module 26 already included. Conventional e-mail specific applications or web-based e-mail applications may advantageously employ this pre-installed option 44.

Since a key goal of the secure e-mail system 10 is ease of use, employing it with web-based e-mail applications particularly facilitates operation by new users and simplifies operation by existing, sophisticated Internet users. Many Internet service providers (ISPs) today supply browser application software to their users. One example is America Online (AOL, TM), which provides its users with a pre-configured "private label" browser application. The pre-installed option 44 permits including the secure e-mail system 10 in the private label browser, and minimizes any set-up burden. Default settings can be set for any configuration options, and the senders 12 and receivers 16 can then optionally tailor the software modules 26 as desired.

Alternately, a user-installed option 46 may be used wherein the software modules 26 are installed by the senders 12 and receivers 16, i.e., the end users, into their respective sending units 18 and receiving units 20. This user-installed option 46 permits use of the secure e-mail system 10 by the large body of Internet users which do not use private label applications.

The user-installed option 46 may be implemented in many variations. One variation 46a is permanent installation of the software module 26 as a plug-in. Another variation 46b is transitory "installation" of the software module 26 as an applet upon each use of the secure e-mail system 10, e.g., a Java applet obtained by using a particular web portal such as Yahoo! (TM). Still another variation 46c is a script driven installation, i.e., essentially a conventional full blown software application installation rather than a compartmentalized plug-in type installation. And yet other variations 46d are possible, say, combinations of those described or even new approaches to installation entirely.

These variations 46a-d may employ downloading from a closely controlled server, such as the security server 24 (FIG. 1). Alternately, some of these may involve distribution by other means, such as loading the software module 26 from a compact disc (CD). CDs are a common way that private label applications are distributed, particularly private label browsers. Rather than distribute an application with the software module 26 already installed according to the pre-installed option 44, an application distribution CD can simply include the software module 26 as an option which the user can decide to install via the user-installed option 46.

Obtaining the software module 26 online provides some peripheral advantages, however. The senders 12 and receivers 16 can formally become registered with the secure e-mail system 10 at the same time and they can comply with any other formalities, such as certifying that they are able to accept and use encryption technology.

The variations 46*a-d*, to different degrees, also may facilitate upgrade options. For example, every time a software module 26 contacts the security server 24 it can include version information as part of its communication. In sophisticated embodiments the software modules 26 may self-upgrade, from the security server 24 or elsewhere, as upgrades become available. In less sophisticated embodiments or where re-certification may be required, information can be sent regarding how to upgrade. For instance, an e-mail message including an upgrade site URL can be send to a sender 12 or receiver 16.

FIG. 3 also depicts some possible configuration options 48 which the senders 12 and receivers 16 may change in the software modules 26. Suitable defaults can be provided in most, if not all situations, but sophisticated users or particular situations may merit changing these settings. While such configuration options 48 generally should persist from session to session, consistent with good security practice they should be associated with a user and not merely with a machine. Thus, where multiple senders 12 or receivers 16 may use the same sending units 18 or receiving units 20, the users may be allowed to set independent personal configurations.

Particular examples of settings in the configuration options 48 may include: an encrypt subject setting 48*a*, a cache password setting 48*b*, a cache time setting 48*c*, an expiration setting 48*d*, a maximum reads setting 48*e*, and others 48*f*.

The encrypt subject setting 48*a* controls whether a software module 26 encrypts the subject field 58 (FIG. 2*a-c*) as well as the body field 60 of the secure e-mail 14. The default typically will be to not encrypt the subject.

The cache password setting 48*b* permits specifying whether a password is required once per application session (e.g., per browser session), or whether a prompt requires the password every time it is needed. The default will generally be to cache the password but, as described next, this can work with a cache time setting 48*c* in a more secure manner. The password can also be cached only in memory and never to disk, for added security.

The cache time setting 48*c* works with the cache password setting 48*b* to control a maximum time which a password can be cached. Default and permitted maximum values for this might be 8 hours. A sender 12 could then shorten the cache time setting 48*c*, but not be allowed to lapse into poor security practices by specifying too high a time.

The expiration setting 48*d* allows a sender 12 to specify when the security server 24 (FIG. 1) should discard a message key, and thus make the secure e-mail 14 unreadable. The default will generally be to not explicitly force expiration, but after some substantially long period of time (perhaps years) the security servers 24 in most embodiments of the secure e-mail system 10 will probably need to do so.

The maximum reads setting 48*e* specifies the number of times that each receiver 16 can open and read a secure e-mail 14, i.e., the number of times that the message key will be sent to a single receiver 16. A default may be zero, meaning that there is no limit.

Of course, still other configuration options 48 may be provided, hence an others 48*f* element is present in FIG. 3 to emphasize this.

Once the software module 26 is installed in a sending unit 18 it is ready for use in message composition and send scenarios. A private label browser where the software module 26 is a plug-in type variation 46*a* will be used in the following discussion, but those skilled in the art will appreciate that the underlying principles are extendable, as well, to other systems which may use the secure e-mail system 10.

Figure 4:
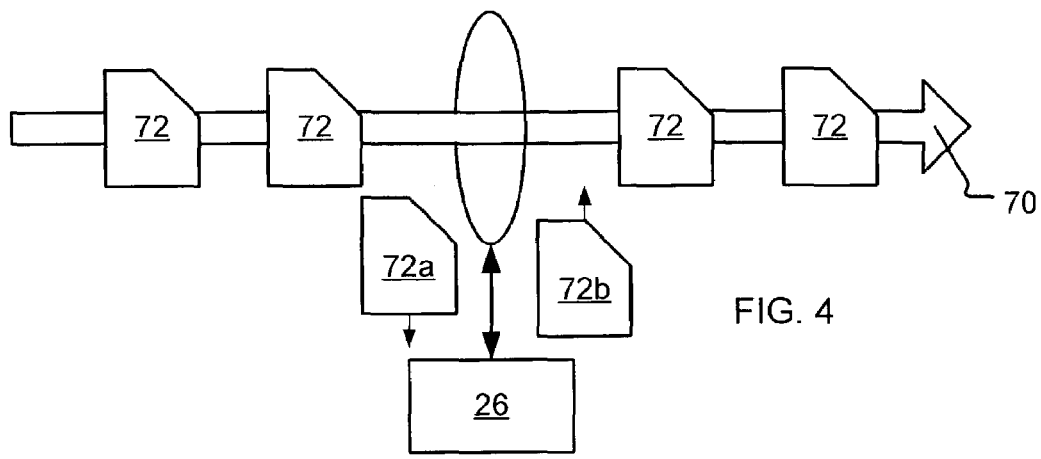
FIG. 4 is a block diagram stylistically depicting an approach for the software modules to determine whether a secure e-mail is being either sent or received.

FIG. 4 is a block diagram stylistically depicting a preferred approach for the software modules 26 to determine whether a secure e-mail 14 is being sent (or received). The software module 26 in the sending unit 18 examines a stream 70 of pages 72 looking for any which allow a sender 12 to compose a secure e-mail 14. One way to examine the stream 70 is for the software module 26 to see if the URL of a page 72 has a certain structure, e.g., "*mail.privatelabel.com*/Compose*" where * can match any pattern. Another way for the software module 26 to examine is to determine if the HTML content of a page 72 has a certain recognizable (static) pattern, e.g., the name of the form tag is "Compose." The software module 26 may also use MIME types to identify possible pages 72 to intercept. If an actual candidate page 72*a* is found it is removed from the stream 70, processed as now discussed, and replaced into the stream 70 as a processed page 72*b*.

Once the software module 26 determines that a page 72 about to be rendered is a composition type candidate page 72*a*, it needs to modify that candidate page 72*a* to include at least one new control, the send securely button 64 (FIG. 2*b*). Other controls in addition to this one button may be added if desired, but they are optional.

The send securely button 64 is "pressed" (operated, say, by a mouse click) by the sender 12 rather than their operating the conventional send button 62 when it is desired to send a secure e-mail 14. When the send securely button 64 is operated the software module 26 intercepts the page 72 (or form) containing the various fields of the e-mail which was about to be posted to the e-mail server 22, and modifies some of those fields. After this modification is complete the software module 26 executes the desired operation (post or send) exactly as would have happened had the sender 12 pressed the send button 62 in the first place. The only difference is that the values in some of the fields in the secure e-mail 14 will now be different, i.e., encrypted.

In the inventor's presently preferred embodiment only two fields are typically modified. The body field 60 is always modified by encrypting it. And depending on the configuration settings, specifically the encrypt subject setting 48*a* described above, the subject field 58 may also be changed.

Figure 5:
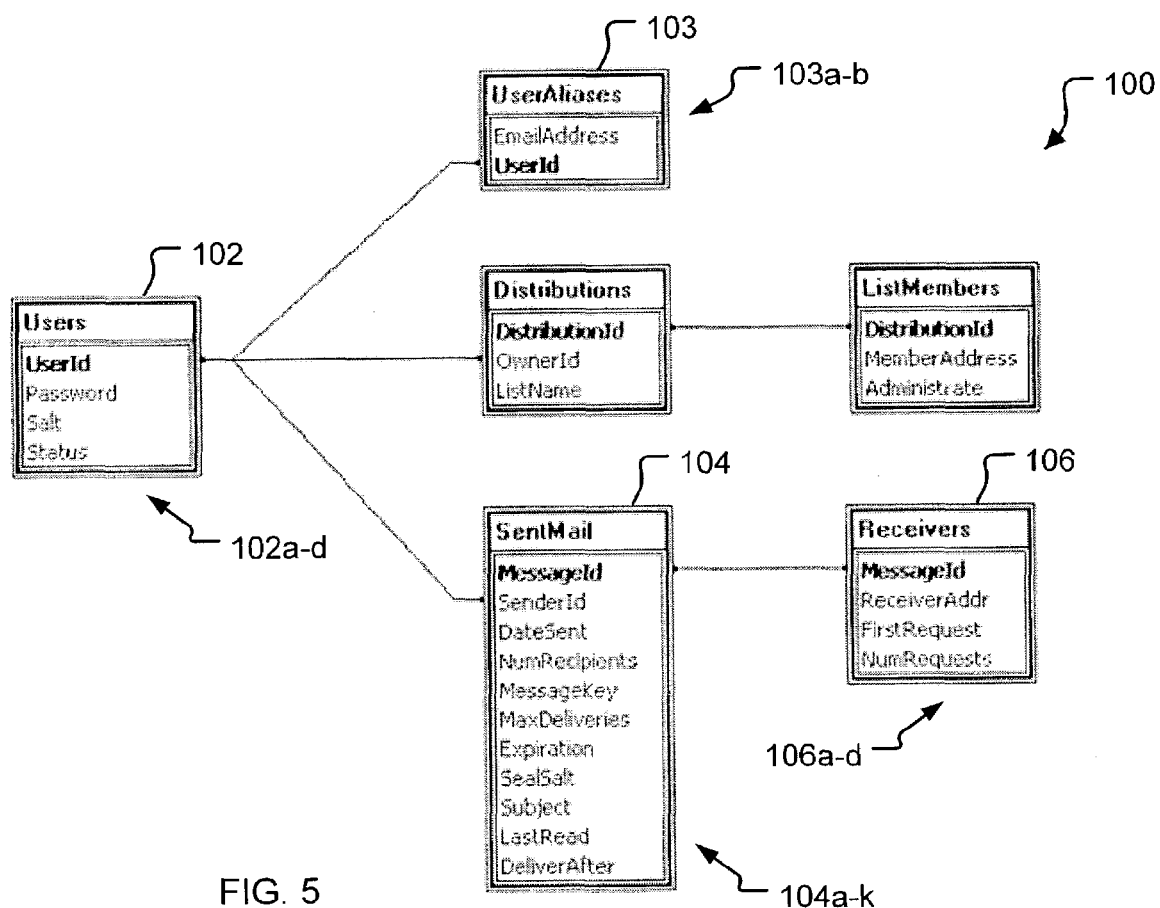
FIG. 5 is a diagram of a relational database including tables useable by the invention in the security server of FIG. 1.

Before examining the processes of encryption and decryption, some discussion of the various data items used by the secure e-mail system 10 is appropriate. FIG. 5 is a diagram of a database 100 including tables used by the secure e-mail system 10. The primary component of the security server 24 (FIG. 1) is this database 100. The registered senders 12 and receivers 16 are collectively treated within the database 100 as users, and data for them is stored in a users table 102.

The users table 102 includes records each having fields for: a userId 102*a*, a password 102*b* (actually a hashed version of the actual password in the preferred embodiment, as presently described), a salt 102*c*, and a status 102*d*.

Closely related to the users table 102 is a user aliases table 103, which includes records each having fields for: an emailAddress 103*a* and a userId 103*b* (relationally linked to the userId 102*a* in the users table 102).

The database 100 also includes a sentMail table 104. This includes records each having fields for: a messageId 104a, a senderId 104b, a dateSent 104c, a numRecipients 104d, a messageKey 104e, a maxDeliveries 104f, an expiration 104g, a sealSalt 104h, a subject 104i, a lastRead 104j, and a deliverAfter 104k.

A receivers table 106 is provided as well. As can be seen in FIG. 5, the messageId 104a in the sentMail table 104 is relationally linked to a messageId 106a in the receivers table 106. Thus, this receivers table 106 contains data for the receivers 16 specified in respective secure e-mails 14. The receivers table 106 further includes records each having fields for: a receiverAddr 106b, a firstRequest 106c, and a numRequests 106d.

FIG. 6a-f are tables of the data fields used by the preferred embodiment. The tables in FIG. 6a-d are important to the core operation of the secure e-mail system 10, while the tables of FIG. 6e-f relate to optional features of the secure e-mail system 10.

The text in the tables of FIG. 6a-d describes some of the particular fields, with the primary fields discussed further presently. FIG. 6a is the users table 102 of FIG. 5. This contains data records for each user, sender 12 or receiver 16, which is registered with the secure e-mail system 10. As each user registers, they are assigned a UserId (userId 102a) and they choose a Password (password 102b) that are stored here. The preferred value of the Password (password 102b) is H(p+s) where p is the cleartext password and s is a salt (salt 102c) concatenated with the cleartext password. FIG. 6b is the sentMail table 104 of FIG. 5. This contains data records for each secure e-mail 14 in the secure e-mail system 10. FIG. 6c is the receivers table 106 of FIG. 5. This contains destination data for each secure e-mail 14 which is to be deliverable by the secure e-mail system 10. Since a record gets generated in this table for each receiver 16 (individual or list group) of each secure e-mail 14 that is sent, it is expected that this table will be the largest by far in the secure e-mail system 10. A null value in the FirstRequest field (firstRequest 106c) implies that the receiver 16 has not requested to read the secure e-mail 14. FIG. 6d is the user aliases table 103 of FIG. 5. This contains data for all known e-mail addresses (emailAddress 103a) for each given user (userId 103b, relationally linked to userId 102a in the users table 102). Thus single users may be known by multiple e-mail addresses, or aliases.

The fields of FIG. 6e-f are not discussed further beyond the following. These tables are used by optional features, and the text in them provides sufficient detail such that one skilled in the art can appreciate the uses of these fields. FIG. 6e is a table of the data used to permit the use of e-mail distribution lists. This table allows the users to create distribution lists. An owner can always update the list, but the owner need not actually be a member of the list. This latter feature is particularly useful for list administrators. And FIG. 6f is a table of the data used to permit the use of the distribution lists. This table contains data about the members of each distribution list.

Of course, other tables and other fields for other data than this shown in FIG. 5 and FIG. 6a-f are also possible, and some of the above fields may be optional and can be omitted in some embodiments of the secure e-mail system 10.

Before encryption of a message can take place the software module 26 must obtain a password for the sender 12. If the password is cached, and if the cache time setting 48c has not been exceeded, this step is satisfied. Otherwise, the software module 26 can display a dialog box which prompts the sender 12 to enter their password. Conventional password handling features can be provided, such as displaying the password only as asterisks and permitting the sender 12 to cancel to abort sending.

In the preferred embodiment the passwords of the senders 12 and the receivers 16 are not the passwords 102b stored in the users table 102. Instead, as a heightened security option, the user picks a password, and this and the salt 102c are hashed by the security server 24 to obtain the password 102b. The user's chosen password is communicated to the security server 24, where a hash of it and the salt 102c takes place and is stored as the password 102b in the database 100. The cleartext of the user's password is not stored at the security server 24, only a computed hash which cannot be computed without the original password.

In this manner the security server 24 never need know, or be able to know, the actual user's password. This option is discussed further, presently.

Once the password 102b is obtained, the software module 26 can perform the operations of encryption and actual sending. In general, the software module 26 sends a request to the security server 24 via secure socket layer (SSL) protocol to authenticate the sender 12 and to obtain back a messageKey 104e for use to encrypt the secure e-mail 14. The software module 26 then encrypts the body field 60 (and optionally also the subject field 58) of the message and the result is then separately encoded to create the secure e-mail 14.

The use of secure socket layer (SSL) was mentioned above. Since a goal of the present secure e-mail system 10 is ease of use, the inventor's present preferred embodiment employs SSL. It is currently considered secure in the industry, being widely used in common browsers, with the average Internet user today using it and not even being aware that they are doing so. It should be appreciated, however, that the use of SSL is not a requirement. Other security protocols may alternately be used.

These notations are now used in the following discussion:
$K_m$=One-time, unique key associated with an e-mail;
$P_s$=Sender's password;
$P_r$=Receiver's password;
$\{p\}_k$=p encrypted with key k;
$\{p\}_{ssl}$=p encrypted with the SSL session key; and
H(p)=One-way hash of p.

Figure 7:
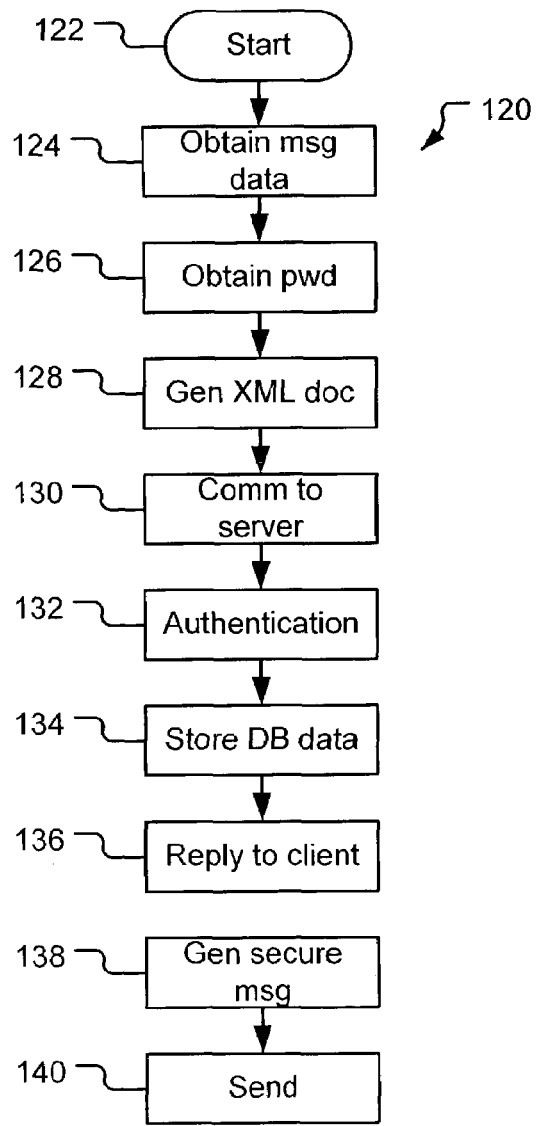
FIG. 7 is a flow chart depicting an encryption process according to the invention that is usable in the embodiment of FIG. 1.

FIG. 7 is a flow chart depicting the presently preferred encryption process 120. At the time the sender 12 is ready to send a secure e-mail 14, an HTML send form 52b (FIG. 2b) is present with plaintext in the body field 60. It is assumed here that the sender 12 has already registered with the security server 24 and that an appropriate software module 26 has been installed into their browser. It is also assumed that the sender 12 is using only a browser to send the secure e-mail 14. The security aspects should be the same regardless of the actual mail client used, and this is used to keep the following explanation simple.

As described previously, the sender 12 selects the send securely button 64 on the send form 52b when they are ready to post. This constitutes a step 122, the start of the encryption process 120.

In a step 124, a script runs which passes the following information to the software module 26 in the sending unit 18:
 the e-mail address of the sender 12 (emailAddress 103a);
 the contents of the To:, CC:, and BCC: fields (instances of receiverAddr 106b);
 the contents of the subject field 58; and
 the contents of the body field 60.

In a step 126, if the software module 26 did not already know the password for the sender 12 it prompts for it. It is a matter of security policy choice whether to require the password to be entered on each send, since this could be unduly cumbersome in some cases. Caching the user's password, and thus also the password 102b, in the software module 26 may be insecure if the sender 12 leaves the browser session open. While the policy will often be to allow the sender 12 to choose how to configure this option, there will also be some cases, e.g., at public kiosks, where it should always be required that a password be entered for each secure e-mail 14.

In a step 128 the software module 26 creates an XML document in the following format, which will be the one encrypted:

<?xml version="1.0" encoding="ASCII"/>
<emailPart random="randomNum" length="numChars"
    mic="messageIntegrityCode">
<subject>subject</subject>
<body>body</body>
</emailPart>.

Here the random element is an anti-cracking feature, it is a large random number used to ensure that even e-mails that are the same in content are not the same when secured; the length element is the number of characters in the body field 60; the mic element is a message integrity code created by taking a hash of the body field 60; the subject element is the contents of the subject field 58; and the body element is the contents of the body field 60.

In a step 130 the software module 26 opens an SSL HTTP (HTTPS) connection to the security server 24, and sends it the following information:

the emailAddress 103a of the sender 12;
the password 102b for the sender 12;
a list of target receivers 16 (receiverAddr 106b, and implicitly numRecipients 104d);
the subject field 58 of the message (subject 104i);
a list of computed hashes, one for the body, H(b), and one for each attachment, $H(a_1), H(a_2) \ldots H(a_n)$; and
optional configuration information such as an expiration time or maximum number of deliveries allowed per recipient.

In a step 132 the security server 24 proceeds depending on the result of an authentication sub-process.

1) If the emailAddress 103a for the sender 12 is unknown, the encryption process 120 can determine a known emailAddress 103a or stop. The emailAddress 103a might be unknown for various reasons. One common example will be that the sender 12 is new to the security server 24. In this case the software module 26 can be directed to open a separate browsing window which allows the sender 12 to register on the spot. Another reason that the emailAddress 103a can be unknown is due to a user error. One simple source of such errors can be that multiple users share the same browser. A sender 12 can then be requested to clarify their identity.

2) If the password 102b of the sender 12 is incorrect, the software module 26 can be instructed to prompt for the password 102b again (perhaps only a limited number of times), or let the sender 12 abort their sending operation (which returns them back to the original HTML send form 52b).

3) If the sender 12 is not allowed to send secure e-mails 14 the encryption process 120 can also stop. This can be for administrative reasons. For example, if the sender 12 has not paid a fee or if there is a court order preventing a user from using this encryption service, etc. The reason for a denial can then be stated in a dialog box that, when acknowledged, can return the user to the original HTML send form 52b (perhaps to instead use the send button 62, and to send the message as a conventional e-mail).

Otherwise, the sender 12 is considered to be authenticated and is allowed to send the presently contemplated secure e-mail 14, and this step 132 is successfully complete.

In a step 134 the security server 24 then creates and populates a record in the sentMail table 104. In particular, unique values are generated here for a messageId 104a (m), a messageKey 104e ($K_m$), and a list of computed seals (sList) for each part of the secure e-mail 14 being sent. The security server 24 computes the seals in sList as $H(H(H(x)+s+t+m+N_m)+N_m)$. The element s is userId 102a of the sender 12; t is the date and time (also stored as dateSent 104c in the sentMail table 104); m is the messageId 104a; $N_m$ is the sealSalt 104h (a random number generated for this particular secure e-mail 14, but separate from the messageKey 104e); and H(x) is from the set of hashes $H(b), H(a_1), H(a_2) \ldots H(a_n)$ received from the software module 26. Note, the contents of sList need not be stored, since they should be re-computable.

In a step 136 the security server 24 responds back to the software module 26 of the sending unit 18 with an SSL packet of information in the form $\{m, K_m, sList\}_{ssL}$.

In a step 138 the software module 26 extracts the messageId 104a (m), the messageKey 104e ($K_m$), and the seals from sList, and proceeds to encrypt the above XML document and each attachment with the messageKey 104e. The software module 26 then destroys that key from memory in the sending unit 18. Specifically, the software module 26 creates a message form having the following general format:

BEGIN SECURECORP SECURED EMAIL

<securecorp:messagePart id="m">
<encryptedPart>encrypted body</encryptedPart>
<seal>seal</seal>
</securecorp:messagePart>

END SECURECORP SECURED EMAIL

If this part of the secure e-mail 14 includes an encrypted body, this is converted from a raw bit stream (post encryption) to an encoded stream so that the encrypted body element is composed of rows of printable (ASCII) characters. If this is an attachment, that is not necessary.

Finally, in a step 140 the software module 26 performs the same action as if the sender 12 had pressed the send button 62 in the send form 52b in the first place. It posts to the e-mail server 22 (perhaps via an e-mail capable web server, e.g., Yahoo! (™), Hotmail (™), etc.). The difference is that the value in the body field 60 of the form being posted is now encrypted and encoded as described above. Similarly, any attachments are encrypted as described above. From the point of view of a conventional e-mail server 22 or a web server, the result looks like a normal e-mail message whose body is just a bunch of gibberish. The secure e-mail 14 can then travel through the normal Internet mail system to arrive at its various destinations.

Attachments were not covered in much detail in the above discussion, but they can easily be handled as well. In the preferred embodiment attachments are each treated much like a body field 60, except that they are not wrapped in XML or encoded (turned into ASCII). Instead a binary header is added which includes protocol version information; a new length element, like that for the body; a copy of the same messageId 104*a* used for the body of the secure e-mail 14; a new mic element created by taking a hash of the attachment body; and a seal (as discussed for sList, above). The attachment is then encrypted using the same messageKey 104*e* as was used for the body of the secure e-mail 14 the header is added to it, and the result is uploaded to the e-mail server 22 in the usual manner.

This approach for attachments has a number of advantages. The database 100 of the security server 24 need not be disturbed by this approach to handling attachments, since the verification mechanism for them is thus carried within the secure e-mail 14 and is protected by the security features applicable there. This can also support any number of attachments. Each attachment is added to the object which will be passed into the software module 26 that does the encryption. Each attachment is encrypted using the same messageKey 104*e* as the body of a message, and the hash of each attachment can be computed using the same algorithm. By giving each attachment a full header it can be decrypted separately from any other attachment or even from the body. By separating the attachments it can also be determined if any particular attachment has been altered. The normal operations on the rest of a secure e-mail 14 can be performed even if the attachments are purposely not included, e.g., when replying to a secure e-mail 14 having attachments.

As noted above, the secure e-mail 14 travels through the normal e-mail system to the inbox of each receiver 16. The receivers 16 can typically go to a screen in their browsers where a summary of all messages that have been received is presented. By clicking on a message summary the browser can then deliver a page formatted with the message in it. This, however, requires that a suitable software module 26 is present.

Once a software module 26 is installed in the receiving unit 20 it is ready for use in message receive and read scenarios. A private label browser where the software module 26 is a plug-in variation 46*a* is also used in the following discussion, but those skilled in the art will here also readily recognize that the underlying principles are extendable to other systems using the secure e-mail system 10.

Returning briefly to FIG. 4, this also stylistically depicts the preferred approach for the software modules 26 to determine whether a secure e-mail 14 is being received. The software module 26 in the receiving unit 20 examines the stream 70 of pages 72 looking for any that contain a secure e-mail 14. The software module 26 can determine whether a page 72 contains a secure e-mail 14 by scanning for "- - - BEGIN SECURECORP SECURED EMAIL - - - " type tags. This can be done quickly, permitting minimal latency in delivering pages which should not be processed further. If an actual candidate page 72*a* is found it is removed from the stream 70, processed as now discussed, and replaced into the stream 70 as a processed page 72*b*, and thus made available for reading by the receiver 16.

Figure 8:
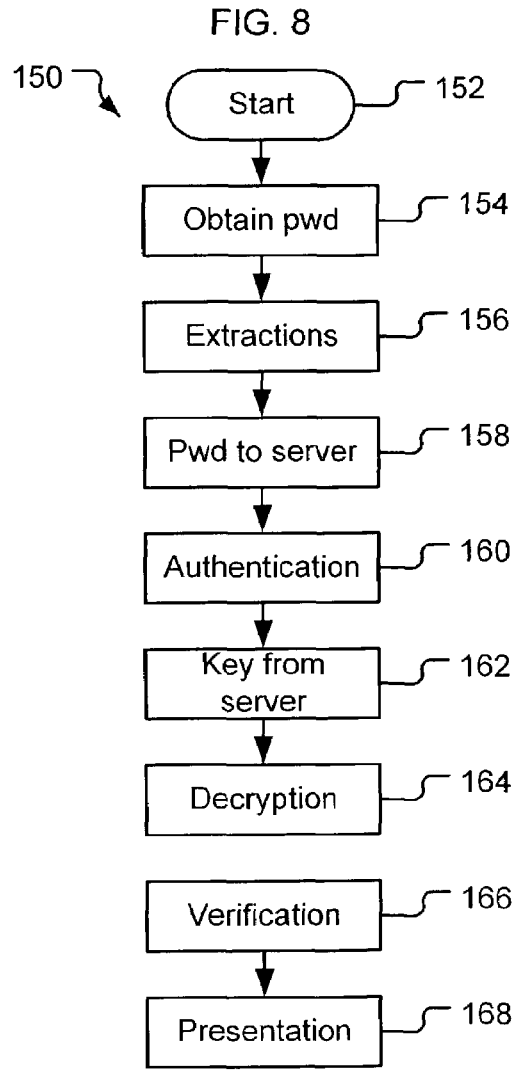
FIG. 8 is a flow chart depicting a decryption process according to the present invention that is usable in the embodiment of FIG. 1.

FIG. 8 is a flow chart depicting the presently preferred decryption process 150. It is here also assumed that the software module 26 has already been installed within a browser running on the receiving unit 20 of a receiver 16, and that the receiver 16 has registered with the security server 24 (the security server 24 perhaps having already generated an e-mail to any receivers 16 not previously registered). Once a secure e-mail 14 (i.e., a secured and sealed XML document created according to the encryption process 120) is selected by the receiver 16, the software module 26 performs the operations of decryption to permit reading of the secure e-mail 14 by its receiver 16. This constitutes a step 152, the start of the decryption process 150.

In a step 154 the password for the receiver 16 is obtained. Recall that both the senders 12 and the receivers 16 are treated as users by the security server 24, and both have equivalent entries in the users table 102 (FIG. 5). If the password 102*b* is not already cached, the receiver 16 is prompted to enter their password. The rules for password caching, prompting, etc. may be the same as for sending.

In a step 156 the software module 26 extracts the messageId 104*a*, decodes (if encoded) the received message and extracts the body field 60 (still encrypted).

In a step 158 the following information is then sent to the security server 24 (via SSL):
 the e-mail address of the receiver 16 (emailAddress 103*a*);
 the password 102*b* of the receiver 16; and
 the messageId 104*a*.

In a step 160 the security server 24 proceeds depending on the result of an authentication sub-process.

1) The security server 24 hashes the receiver's password with the salt 102*c* to determine the password 102*b*.

2) The password 102*b* is verified, based in part on association with the emailAddress 103*a* of the receiver 16. If this part of the authentication fails, the response to the software module 26 results in the receiver 16 being prompted for the correct password 102*b* or the decryption process 150 aborting.

3) It is determined whether the receiver 16 is authorized to read the present secure e-mail 14. For this, the e-mail address of the receiver 16 must match the receiverAddr 106*b* in the receivers table 106 for the particular messageId 106*a*, the numRequests 106*d* must be less than the maxDeliveries 104*f* for this secure e-mail 14, and the expiration 104*g* must not indicate that the message has already expired. If this authorization fails, the response to the software module 26 results in notifying the receiver 16 and then exiting the decryption process 150 without decrypting the secure e-mail 14.

Note, if either of these tests fail, the browser page can simply display as if it does not contain encrypted material, i.e., as unintelligible gibberish where the body field 60 would normally be. The sender id field 66, the various receiver id fields 56, and possibly also the subject field 58 (depending upon configuration) can still be intelligible, however. The receiver 16 may thus be able to contact the sender 12 or any other receivers 16 to determine if the secure e-mail 14 was important and if measures outside the secure e-mail system 10 are appropriate. If these tests are successful, the receiver 16 is considered to be authenticated and this step 160 is complete.

In a step 162 the security server 24 sends the messageKey 104*e* back to the software module 26 of the receiver 16 via SSL.

In a step 164 the software module 26 decrypts the secure e-mail 14, using this same messageKey 104*e* and the reverse of the basic process as was used to encrypt it.

In a step 166 the software module 26 validates the secure e-mail 14. This involves a second round of communications with the security server 24. The software module 26 generates new hashes of each part of the secure e-mail 14 and sends these and the seals included in each message part to the security server 24. The security server 24 then computes new seals, based on the passed in hashes, which it compares with the passed in seals. If there are any differences, this is an indication that the secure e-mail 14 is not authentic. The security server 24 then sends an indication about the authenticity of the secure e-mail 14 back to the software module 26.

Finally, in a step 168 an HTML receive form 54 is presented to the receiver 16 showing the plaintext body field 60 of the secure e-mail 14 where the encrypted message used to be. Further, if the indication about authenticity from the security server 24 was negative, the software module 26 presents a message advising the receiver 16 in this regard as well.

Also in the preferred embodiment, as an optimization of in the decryption process 150, the software module 26 caches the messageKey 104e so that the same message can be read again within the same session without accessing the security server 24. However, this is only for read operations and the messageKey 104e is never stored on disk.

Decryption of any attachment is simply performed using the same messageKey 104e and the same basic process. The only differences are that a binary header is used, as described earlier, and the information in an attachment is not encoded.

In summary, the software modules 26 of the preferred embodiment should: intercept and parse HTML pages before they are rendered; selectively modify HTML pages before they are rendered; extract data from HTML forms and pages; send data to a security server via a secure means (e.g., secure HTTP, SSL); perform symmetric key encryption and decryption using the same algorithm for both actions (e.g., Blowfish symmetric key encryption/decryption); perform hashing (e.g., secured hash algorithm one, SHA-1); display dialog boxes (for password entry, configuration, error messages, and seal verification results); and, preferably, be able to self-upgrade.

The security features underlying the preceding encryption process 120 and decryption process 150 bear some further analysis. For authentication purposes, the operator of the security server 24 knows the sender 12 because their emailAddress 103a should associate with their password 102b. If the password 102b is treated the way it is supposed to be, i.e., only the holder should know it, then the operator of the security server 24 can be sure that only the sender 12 could have sent a particular secure e-mail 14. But the sender 12 does not necessarily even have to be trusted. By storing the sealSalt 104h initially, it is also possible for the operator of the security server 24 to be sure that no one, including the sender 12, can alter a secure e-mail 14 after it is sent. As an added security feature the sealSalt 104h may be stored encrypted in the database 100, and then never shared and never allowed to leave the security server 24. By encrypting the hashes of the body and attachments (H(b), H(a)) with the SSL key after the sender 12 has been authenticated (by providing the password 102b) it is possible to determine that it is the sender 12 who is signing their secure e-mail 14. Because the security server 24 stores only a hash of the actual password of the sender 12 as the password 102b, there is no way even the operator of the security server 24 can falsely sign a secure e-mail 14 on behalf of the sender 12.

Because the messageKey 104e is symmetric and because an outside entity is storing it, i.e., the security server 24, it is possible for someone to decrypt a secure e-mail 14 if they have intercepted both the secure e-mail 14 and also obtained its messageKey 104e, say, by breaking into the database 100. Interestingly, just having one or the other here does not do any good. This approach can be even further strengthened by encrypting the messageKey 104e with a public key. Then, breaking into the database 100 still does not help, since one would need the appropriate private key to be able to obtain the messageKey 104e needed to crack any given secure e-mail 14. A brute force attack on the database 100 therefore becomes infeasible. Also, to the extent possible, the operators of the security server 24 can put the necessary private key into actual hardware, making it virtually impossible to break into the database 100 without physical access to the actual machines being employed.

Reading a secure e-mail 14 is simpler than sending it. The only concern here is that there is a single key per message (messageKey 104e) used for decryption. Therefore there is a moment within the software module 26 where that key is in the clear on the receiver's machine and it is possible to access it. However, all that permits is reading the current secure e-mail 14 which the receiver 16 is allowed to read anyway. Hence, there is only a risk here if an unauthorized person can gain access to the key for the brief time that it is in memory. This would be extremely difficult, and it follows that, if the key could be stolen in this fashion, the decrypted message could just as easily (if not more so) also be stolen. So why bother with the key? In sum, this is not much, if any, of a security risk.

The use of the seal provides for non-repudiation via the operator of the security server 24 acting as a trusted third-party notary. In particular, a judge can determine whether a message was actually sent from a sender 12 by giving the operator of the security server 24 the seal, the hash of the message and the name (to map to the userId 102a) of the sender 12. As was described for the preferred embodiment, a receiver 16 can verify that a seal is genuine (which proves that the sender 12 actually wrote and sent a particular secure e-mail 14), by sending the seal and a hash of the body of the received message to the security server 24. The security server 24 can then provide an assurance in this regard. The seal is used at the security server 24 to determine whether it is genuine by re-computing it based on the three known quantities. This technique is known as "non-repudiation with secret keys" and is taught by Kaufman et al. in "Network Security: Private Communication in a Public World," Prentice-Hall, 1995, pp. 343-44.

Obviously, much of the security in the embodiments described here is also based on the strength of SSL. Currently, this seems to be an accepted standard, so we will not concern ourselves here with the fact that both the password 102b of the sender 12 and the messageKey 104e are sent over it. However, the strength of the security of the secure e-mail system 10 is not dependent on SSL. As more secure protocols for protecting a communications channel become available (e.g., Transport Layer Security or TLS), the invention can easily use such a protocol.

Up to this point the invention has been discussed primarily by presenting the secure e-mail system 10 as an example of it. The invention can, however, be used much more generally to build and deploy a variety of solutions that address the problem of secure communication. For example, without limitation, the invention also particularly facilitates enterprise instant messaging (EIM), video-conferencing, and secure real-time document editing. These are just additional examples of communication schemes employing message headers to deliver or route message content, and the present invention can be used with effectively any such communication scheme.

The solutions the invention provides are also particularly suitable for collaborative use by organizations. By using the invention, organizations can satisfy the most stringent security requirements while enabling their constituents to freely and easily collaborate via a rich set of techniques and media.

The following terms are used frequently throughout the rest of this document and are defined here for convenience:

Confidentiality protection—Ensuring that data can only be viewed by authorized recipients, irrespective of the data location (i.e., in transit or in storage).

Conversation key—A symmetric key that protects conversation data.

Conversation data flows from a single source to one or more destinations.

Hub—The network server that processes messages and relays them to appropriate destinations.

Integrity protection—Ensuring detection of unauthorized modification to data in transit or in storage.

Join—To start participating in a collaboration.

Key server—A network server that holds protection keys and releases them to authorized users.

Leave—To stop participating in a collaboration.

Header key—A symmetric key that protects the header of a message. Header keys are individually established between the hub and each spoke.

Message—The basic unit of data exchanged between collaborating parties. A message has two parts, a "header" and "content."

Message content—Data that is produced by a collaborating party and is destined for one or more other parties.

Message header—Data that helps the message router deliver the contents to its destinations.

Protection—Confidentiality and integrity protection.

Spoke—Senders or receivers of data; spokes do not relay data.

Transcript—A record of some part of the collaboration.

Figure 9:
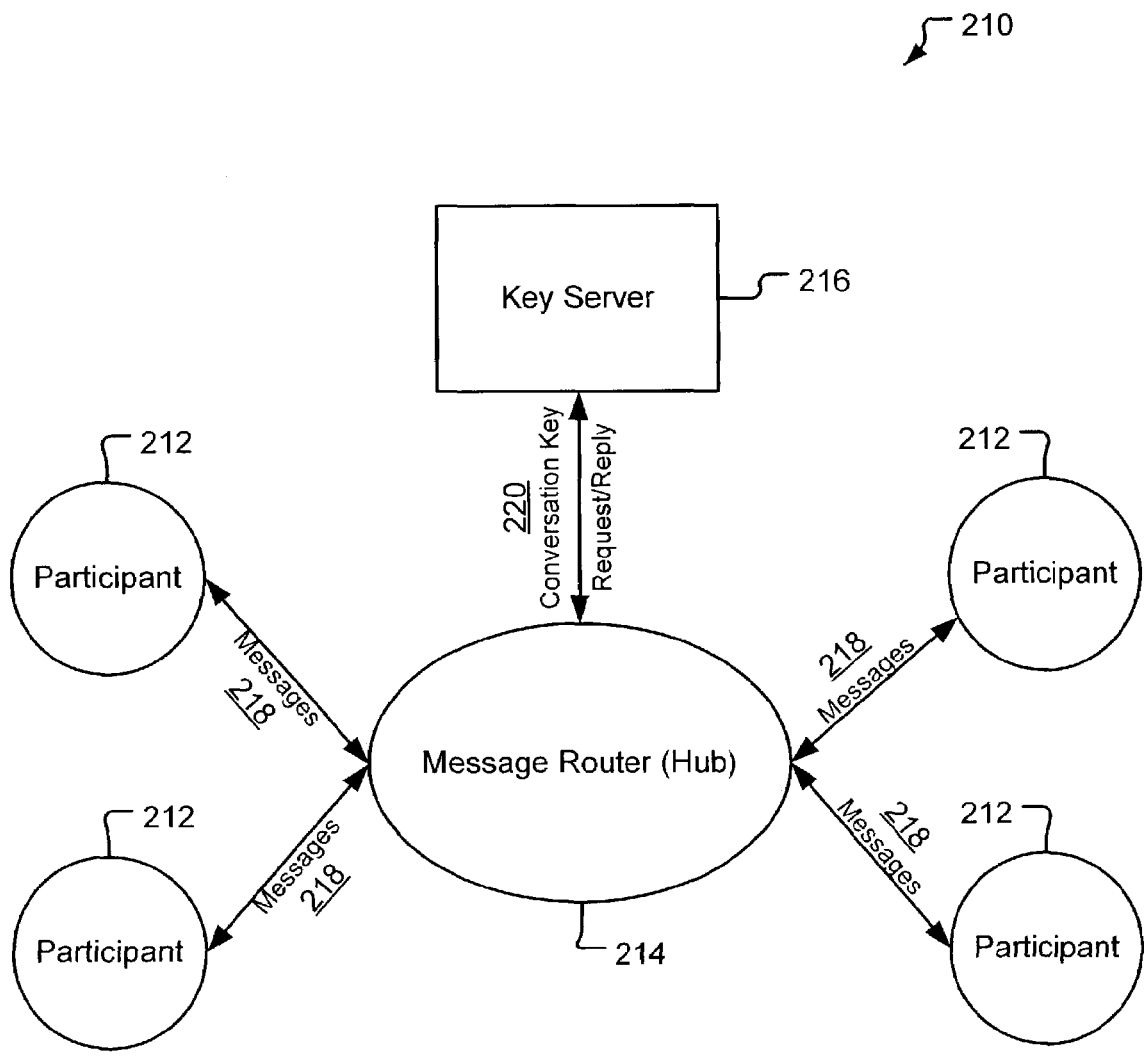
FIG. 9 is a schematic block diagram depicting the major components of a generic form of the invention for secure collaboration and key exchange.

FIG. 9 is a schematic block diagram depicting the major components of a security server system 210 according to the present invention. These major components include collaboration participants 212, one or more message routers 214, and one or more key servers 216.

Although mostly generalized, the embodiment of the invention depicted in FIG. 9 is particularly suitable for collaborative communication in an enterprise. Accordingly, the collaboration participants 212 here are equivalent to the sending unit 18 and receiving units 20 in FIG. 1. The message router 214 is equivalent to the e-mail server 22 in FIG. 1 (or conventional routers). As described presently, however, the message routers 214 here may particularly be under the control of an enterprise using the security server system 210. The key server 216 in FIG. 9 is equivalent to the security server 24 in FIG. 1.

The collaboration participants 212 are the source (source participant 212a) and/or the destination (destination participant 212b) for the messages 218. As described presently, conversation keys 220 are used to protect the contents of the messages 218.

The message routers 214 deliver the messages 218 to the intended collaboration participants 212. Although the messages 218 may actually pass through multiple message routers 214, this is illustrated in the figures conceptually with just one message router 214 (or the e-mail server 22 and the possible routers through which a secure e-mail 14 might pass). When multiple message routers 214 are present, each "sees" the others much like it sees a collaboration participant 212. The collaboration participants 212 each maintain at least one persistent connection with the message router 214 (or the "closest" message router 214).

The key server 216 creates the conversation keys 220 or it can receive them from source participants 212a. The key server 216 then stores and releases the conversation keys 220 to the parties that are the collaboration participants 212 (presumably after authentication and authorization, but various schemes can be used for that and it is not a topic that is germane here). The key server 216 can also create or store conversation keys 220 in bulk, releasing arbitrary number upon request. A client that is a server-class device (e.g., an email gateway) can thus get a bulk set of conversation keys 220 and protect each message 218 with a unique one, without needing to ask the key server 216 for a unique conversation key 220 every time.

To simplify the following discussion, encryption and decryption is used as the primary example of protection. Encryption/decryption with a key protects the confidentiality of a message. It should be appreciated, however, that this is only one possible example of protection. The integrity of a message can be protected using a keyed message digest (also known as Hashed Message Authentication Code, or HMAC), or both types of protection can be applied. For example, the key server 216 can create a 256-bit key and release it to a source participant 212a. The source participant 212a can then use the first 128 bits for encryption and the second 128 bits for HMACing.

Since the conversation keys 220 are used for encryption or hashing and later need to be retrieved for use in decryption or hash analysis, the key server 216 associates a unique ID with every conversation key 220. The unique ID, or something from which it can be derived, is then sent in the clear with each protected message 218. Thus, a collaboration participant 212 submits a request for a conversation key 220 to the key server 216 and the key server 216 responds with a reply back to the collaboration participant 212 containing the requested conversation key 220. The key server 216 is generic and can be used to manage the conversation key 220 for any type of application. The session between the collaboration participant 212 and the key server 216 thus is a secure session.

FIG. 1 and FIG. 9 differ in a major respect that illustrates an optional but highly useful feature of the invention. In FIG. 1 the e-mail server 22 and the security server 24 are depicted as having no direct communication. This scheme works well, for example, if the e-mail server 22 (or message hub used in its stead) is conventional. In contrast, in FIG. 9 the message router 214 and the key server 216 are depicted as having direct communication. This scheme works well if the message router 214 is designed to work in the security server system 210. The message router 214 can then be the entity that instructs the key server 216 to create new conversation keys 220 when a collaboration participant joins or leaves a conversation.

Figure 10:
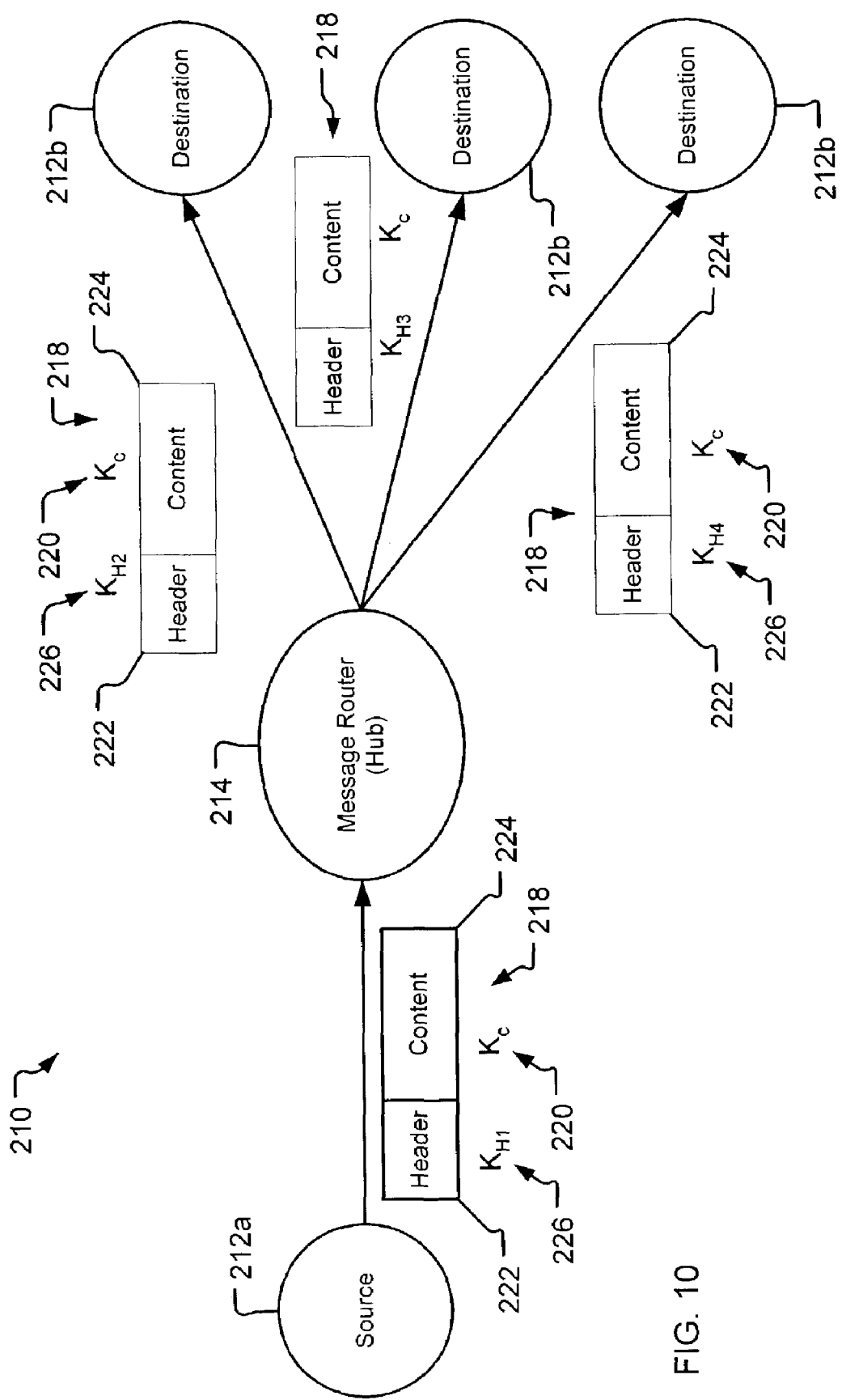
FIG. 10 is a schematic block diagram depicting the typical flow of a message in the generic form of the invention in FIG. 9.

FIG. 10 is a schematic block diagram depicting the typical flow of a message 218 in the security server system 210. The message 218 includes a message header 222 and a message content 224.

The message header 222 includes data that helps the message router 214 deliver the message 218 to its destinations, i.e., one or more destination participant 212b. Some examples of elements in the message header 222 are:

To—The destinations of the message.
From—The origin of the message.
Date—The date and time of message creation.
Message ID—A unique identification for the message.
Content length—The length of the content.
Content type—The MIME type of the content.
Priority—The priority of the message.

The message content 224 includes data that is produced by a source participant 212a and destined to one or more destination participants 212b. Of course, the collaboration participants 212 can and often do change roles as source participant 212a and destination participant 212b if multiple messages 218 are exchanged during the course of a collaboration. The message routers 214 do not inspect the message content 224. [Special services such as content filtering and virus scanning can examine the message content before forwarding it to its destinations. However, this is an optional service and is independent of message routing.]

FIG. 10 also shows how the depicted embodiment of the security server system 210 actually uses two types of keys for protecting data. Again with protection being with respect to confidentiality, integrity, or both. Firstly, the message router 214 establishes a header key 226 with each collaboration participant 212. The header key 226 protects the message header 222 of a message 218. Every connection between a message router 214 and a collaboration participant 212 uses a different header key 226. The key server 216 does not create, store, or manage the header keys 226. Moreover, the header keys 226 are ephemeral and do not last beyond the life of the session between the message router 214 and the collaboration participant 212. Secondly, a conversation key 220 protects the content of a message 218. It is possible for any process (collaboration participant 212 or message router 214) to create (request and be granted) a conversation key 220. Using this two key approach enables efficient, yet highly secure distribution of messages 218 from their source to their destinations.

This use of two keys is also different than the scheme depicted in FIG. 1, where only one key equivalent to the a conversation key 220 is used. The use of the header key 226 is optional, but adds additional security. An enterprise that controls the message router 214, for instance, may wish to impose this added level of security and keep even the information in the message header 222 secure.

The message router 214 only needs to process the message header 222 of a message 218 to perform its tasks. In FIG. 10, it uses the header keys 226 ($K_{H1}$, $K_{H2}$, $K_{H3}$, or $K_{H4}$), depending on the collaboration participant 212 with which it communicates. The message content 224 of the message 218 simply flows through the message router 214 unmodified, and the destination participants 212b then request and use the same conversation key 220 ($K_C$) to decrypt and to verify the integrity of the message content 224 of the message 218. Separating the header key 226 from the conversation key 220 in this manner is advantageous in that each message router 214 can "stream" messages 218 to the next, without needing to verify the integrity of the entire message content 224. This is in contrast to SSL and IPSec, that must artificially break messages into manageable blocks and encrypt each block individually.

In order to provide forward and backward secrecy, the message router 214 can change or "roll over" the conversation key 220 when any of the following events occur. When a new collaboration participant 212 joins a conversation, the message router 214 can see that the conversation key 220 is changed. All of the messages 218 communicated prior to this event remain encrypted using the old conversation key 220 and, by default, are not made available to the new collaboration participant 212. Similarly, when an existing collaboration participant 212 leaves the conversation (e.g., disconnects from the message router 214), all of the messages 218 communicated subsequent to this event are encrypted using a new conversation key 220. This new conversation key 220 is not, by default, available to the departing collaboration participant 212. Under the preferred embodiment of the security server system 210, transcripts remain encrypted while in storage. Therefore, depending on the sequence of events during a collaboration (i.e., join and leave operations), there may be multiple conversation keys 220 that encrypt different parts of a conversation.

The conversation key 220 rolls over process can be optimized, say, when there may be large numbers of collaboration participant 212, in keeping with the enterprise collaboration theme of this embodiment of the invention in FIGS. 9 and 10. Even though the message router 214 generally should not be able to access the actual (encrypted) message content 224, it can determine when the message content 224 is substantive. For example, information in the message header 222 may indicate this or the message content 224 may be absent. With this information the message router 214 can defer rolling over the conversation key 220 until the next substantive message 218 is encountered. Thus, multiple collaboration participants 212 may join a new conversation and the conversation key 220 is not automatically rolled over as each joins. Instead, the conversation key 220 is rolled over when a substantive message 218 is sent. Similarly, multiple collaboration participants 212 may leave an existing conversation and the conversation key 220 is not rolled over until the next substantive message 218 is sent.

The following discussion summarizes, without limitation, some of the novel ideas the security server system 210 implements. It can assign and use a single conversation key 220 to protect data throughout its life. By use of this single conversation key 220, the message router 214 need not decrypt and re-encrypt the messages 218. This enables highly efficient routing of the messages 218 and permits scalable, enterprise-class collaboration systems.

In contrast, existing technologies use multiple keys for protecting data (with respect to confidentiality and integrity) as it is transmitted from its origin to multiple destinations. Typical implementations employ the secure socket layer/transport layer security (SSL/TLS) or IPSEC protocols. Using SSL/TLS every message must be encrypted at its origin, decrypted at the server that routes it (i.e., the hub), re-encrypted again at the hub, and finally decrypted at the final destination.

The security server system 210 can also easily maintain forward and backward secrecy. When a new collaboration participant 212 joins or when an existing collaboration participant 212 leaves a collaboration, the conversation key 220 can be changed. This assures all the collaboration participants 212 that new users do not have access to any part of the collaboration data prior to joining and, similarly, that users who have left the conversation do not have access to the collaboration data after leaving. Even if an attacker can remain connected to the security server system 210 and receive messages 218, the conversation key 220 to decrypt that message content 224 of those messages 218 will not be available to them.

In contrast, existing technologies rely on the state of the connection to maintain secrecy. That is, a user who is not connected to the hub cannot receive collaboration data. While this works for unsophisticated users, it is not a secure technique for protecting collaboration data from more sophisticated attackers.

The security server system 210 also permits efficient multi-user participation. It minimizes the number of encryptions and decryptions at the message router 214 by not performing encryptions or decryptions with the conversation key 220 at the message router 214. In fact, the number of encryptions and decryptions applied to the collaboration data at the message router 214 is independent of the number of collaboration participants 212.

In contrast, existing technologies degrade in performance when the number of users increases. There are many factors that contribute to such performance degradation, but a major one is the number of protection operations performed at each component of the system. Existing technologies use a session key for protecting the collaboration data. This is inefficient because the number of sessions is proportional to the number of users, and the number of required protection operations increases with the number of users.

The security server system 210 also permits multiple, secure threads in the same collaboration or session. This is because collaboration data (message content 224) is protected using the conversation key 220 rather than a session key. Thus, a session may use multiple conversation keys 220 depending on the set of authorized collaboration participants 212.

Existing technologies use a session key to protect the collaboration data. Protection of multiple threads of conversations within the same collaboration therefore requires multiple sessions. This in turn results in rigid and inefficient systems.

The security server system 210 also handles transcripts more elegantly. It uses the same set of conversation keys 220 for protecting the message content 224 during, and after the collaboration. This results in more flexible, yet highly secure collaboration systems.

Technologies that use session keys have rigid techniques for protecting a transcript of the collaboration data, because session keys are ephemeral and do not last beyond the end of a collaboration.

The security server system 210 also improves on other existing security technologies as now described. A collaboration technology that uses public key infrastructure (PKI) for all of its security function results in inefficient and rigid systems. Protecting collaboration data using PKI requires all participants to have PKI digital certificates. In contrast, the security server system 210 can use PKI certificates to authenticate any collaboration participant 212. However, owning a PKI certificate is not required. Thus, collaboration participants 212 who can prove their authenticity at a sufficiently strong level can engage in the collaboration.

A collaboration technology that is based on IPSec must use individual Security Associations (SA). First, an SA is ephemeral and SA keys can practically only protect collaboration data while in transit. Second, an SA is specific to a source/destination pair. Therefore, collaboration applications (e.g., Instant Messaging) that work based on a hub-and-spoke model require protection of data as information travels through multiple SAs. In contrast, the security server system 210 can protect collaboration data (message content 224) while in transit and in storage using the same base technology.

A collaboration technology that uses SSL/TLS requires multiple SSL/TLS sessions. First, a session is ephemeral and session keys can practically only protect the collaboration data while in transit. Second, a session is specific to a client/server pair. Therefore, collaboration applications (e.g., Instant Messaging) that work based on a hub-and-spoke model will require protection of data as information travels through multiple sessions. In contrast, the security server system 210 can protect collaboration data while in transit and in storage (i.e., a transcript) using the same base technology.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present invention, which has been illustrated herein with the secure e-mail system 10 and the security server system 210 as examples, is well suited for application in current network environments such as the Internet. The Internet, in particular, has been widely regarded as a wild frontier, largely untamed and unregulated, and where one should proceed with caution. It is also widely considered to be an environment where rapid change, limited understanding, and poor implementations of technology have left even the presumably best prepared at risk. Regardless of the extent to which these concerns are actually true, it is incontestable that there is an existing and growing crisis of confidence when it comes to the security of communications via the Internet.

The invention provides message protection to achieve confidentiality, integrity, or both. Using the secure e-mail system 10 to illustrate this here, a sender 12 may employ the invention by simply registering and running a software module 26 on whatever sending unit 18 they may be using, e.g., personal computer, Internet appliance, etc. The software module 26 may be provided as a pre-installed option 44, present in their dedicated e-mail application, an e-mail enabled browser, or an e-mail portal accessible via a web-browser. Alternately, the software module 26 may be provided as a user-installed option 46, wherein installation may be as a plug-in to the e-mail application, as a scripted modification of such an application, or even simply as an applet. In particular, running the software module 26 as an applet is minimally burdensome and it is actually somewhat of a misnomer to term this "installation."

The secure e-mail system 10 is similarly easy to use by receivers 16 of its secure e-mails 14, not even requiring that they be pre-registered. A sender 12 may send a secure e-mail 14 to one or an entire list of receivers 16, and the invention can automatically handle determining which particular receivers 16 are already registered and which will need to register to read a secure e-mail 14. The invention can then advise unregistered receivers 16 how to achieve registration and install a variation of the software module 26 (which again may be as minimally intrusive as an applet). The secure e-mail 14 goes directly to the inboxes of its receivers 16, and it is left to the receiver 16 (and any expiration instructions of the sender 12) to determine when and if the secure e-mail 14 can be decrypted and read.

The present invention notably overcomes user complexities of prior art systems. The major security element is making conversation keys available to any user who has authenticated by any means sufficient to the key server. This could be a simple password, digital certificates, biometric, etc. This simplicity is in marked contrast to the predominant current public-private key scheme, wherein senders and receivers must resort to directories of one another's certified public keys, and all parties must be pre-registered and present in such directories (plural, because there are a number of competing operators of such systems). The currently predominant scheme is also not well liked because of reasons beyond its initial set-up burden. It uses complex keys, often having hundreds of digits, and thus not able to be memorized and usable away from a system which has some means to access such complex pre-stored keys. For example, the only practical way to use a public-private key system at public kiosks is for users to employ a hardware aid for key storage, such as a smart card. The embodiments of the invention do not require hardware aids (although they may optionally use such), and they do not necessarily "tether" users to only a few pre-set systems.

The present invention is also easily and economically implementable in the currently existing Internet environment. It employs little or no additional materials The security server 24 or key server 216 may even be incorporated onto other server hardware, while the e-mail server 22 or message router 214 will typically already be present or can be modified instances of generally conventional servers (e.g., sophisticated instances the message router 214). Constructing embodiments of the invention is also within the range of skills of many currently practicing in the software and communications arts. It also, notably, requires no changes in the underlying Internet environment in which it may work. Between the senders 12 and the receivers 16, or the collaboration participants 212, the messages within the present invention appear and are handled essentially as conventional messages, traveling via conventional routes and using essentially standard servers. Within the Internet environment, only the security server 24 or key server 216 of the invention is added, and it (as contrasted to the data it "serves") appears as merely another server operating in this environment.

The present invention also addresses the growing needs of enterprises and other organizations to provide collaborative communications. Using the security server system 210 to illustrate this, we have shown how e-mail, instant messaging, video-conferencing, multi-party document editing and, for that matter, virtually any message 218 having a message header 222 and a message content 224 can be secured. Conversations can be carried out by, potentially, large numbers collaboration participants 212, in which many messages 218 on a related topic are securely and efficiently exchanged. The collaboration participants 212, alternatingly, can be the source and destination of the messages 218 from one another in such collaborative conversations. The security server system 210 maintains a high level of security during the conversations, securing the message contents 224 and, optionally, also the message headers 222. It can also efficiently handle collaboration participants 212 joining and departing the conversations, thus providing an ability to scale that prior art systems cannot match.

For the above, and other, reasons, it is expected that the present invention will have widespread industrial applicability. Therefore, it is expected that the commercial utility of the present invention will be extensive and long lasting.

| | |
|---|---|
| 10 | secure e-mail system |
| 12 | sender |
| 14 | secure e-mail |
| 16 | receiver |
| 16a | first receiver |
| 16b | second receiver |
| 18 | sending unit |
| 20 | receiving unit |
| 20a | first receiving unit |
| 20b | second receiving unit |
| 22 | e-mail server |
| 24 | security server |
| 26 | software module |
| 30 | network environment |
| 32-42 | stage |
| 44 | pre-installed option |
| 46 | user-installed option |
| 46a-d | variations |
| 48 | configuration options |
| 48a | encrypt subject setting |
| 48b | cache password setting |

-continued

| | |
|---|---|
| 48c | cache time setting |
| 48d | expiration setting |
| 48e | maximum reads setting |
| 48f | others |
| 50 | e-mail forms |
| 52a-b | send forms |
| 54 | receive form |
| 56 | receiver id fields |
| 58 | subject field |
| 60 | body field |
| 62 | send button |
| 64 | send securely button |
| 66 | sender id field |
| 70 | stream |
| 72 | page |
| 72a | candidate page |
| 72b | processed page |
| 100 | database |
| 102 | users table |
| 102a | userId |
| 102b | password |
| 102c | salt |
| 102d | status |
| 103 | user aliases table |
| 103a | emailAddress |
| 103b | userId |
| 104 | sentMail table |
| 104a | messageId |
| 104b | senderId |
| 104c | dateSent |
| 104d | numRecipients |
| 104e | messageKey |
| 104f | maxDeliveries |
| 104g | expiration |
| 104h | sealSalt |
| 104i | subject |
| 104j | lastRead |
| 104k | deliverAfter |
| 106 | receivers table |
| 106a | messageId |
| 106b | receiverAddr |
| 106c | firstRequest |
| 106d | numRequests |
| 120 | encryption process |
| 122-140 | steps |
| 150 | decryption process |
| 152-168 | steps |
| 210 | security server system |
| 212 | collaboration participant |
| 212a | source participant |
| 212b | destination participant |
| 214 | message router |
| 216 | key server |
| 218 | message |
| 220 | conversation key |
| 222 | message header |
| 224 | message content |
| 226 | header key |

What is claimed is:

1. A system for securely communicating a message between a plurality of participants, wherein the message has a message header and a message content, the system comprising:
   a message router that connects the participants via a network and delivers the message between the participants based on the message header; and
   a key server that stores and releases conversation keys to the participants, wherein said conversation keys are used to apply protection to the message content of the message.

2. The system of claim 1, wherein said protection includes at least one member of the set consisting of encrypting and hashing.

3. The system of claim 1, wherein:
the participant sending the message is a source participant;
the participants receiving the message are destination participants; and
said key server releases a new said conversation key to said source participant based on request by said source participant, thereby permitting said source participant to protect the message content of the message with said new said conversation key.

4. The system of claim 3, wherein said key server releases a plurality of said new said conversation keys based on a single said request, thereby avoiding having to ask said key server to release a said conversation key every time one is desired.

5. The system of claim 1, wherein:
the participant sending the message is a source participant;
the participants receiving the message are destination participants; and
said key server accepts a new said conversation key from the said source participant based on request by said source participant, thereby providing said key server with said conversation key for storage and later release to a said destination participant.

6. The system of claim 5, wherein said key server accepts a plurality of said new said conversation keys based on a single said request, thereby avoiding having to ask said key server to provide a said conversation key every time one is desired.

7. The system of claim 1, wherein said key server releases an existing said conversation key to a said destination participant based on request by said destination participant and authorization by said source participant, thereby permitting said destination participant to process the message content of the message with said existing said conversation key.

8. The system of claim 1, wherein a unique identifier is associated with said conversation key, thereby permitting said destination participants to provide said identifier to said key server when requesting a particular said conversation key to process the message content of the message.

9. The system of claim 1, wherein said message router creates, stores, and releases header keys to the participants, wherein said header keys are used to protect the message header of the message.

10. The system of claim 9, wherein said header keys are based on a member of the set consisting of secure socket layer and transport layer security.

11. The system of claim 9, wherein said header keys are different for each of the participants.

12. The system of claim 11, wherein:
a conversation is an exchange of a plurality of topically related instances of the messages;
a conversation participant is a member of the set of the participants participating in said conversation;
said conversation participants maintain at least one persistent connection with the message router for the duration of a session in which they participate in a said conversation; and
said header keys are different for each said session.

13. The system of claim 1, wherein said message router is able to receive from one of the participants and communicate to said key server an instance of the message requesting a said conversation key and said message router is further able to receive from said key server and communicate to one of the participants an instance of the message that contains a said conversation key, thereby facilitating said key server releasing said conversation keys to the participants.

14. The system of claim 13, wherein:
an instance of the message requesting a said conversation key is a key request message; and
said message router makes a determination whether to communicate said key request message to said key server based on the message header of said key request message.

15. The system of claim 13, wherein:
a conversation is an exchange of a plurality of topically related instances of the messages;
a conversation participant is a member of the set the participants participating in said conversation;
a joining participant is a potential said conversation participant seeking to participate in said conversation;
a departing participant is an existing said conversation participant seeking to no longer participate in said conversation;
said key server can create, store, and release one or more said conversation keys that protect the message content of subsets of the messages in said conversation; and
said message router instructs said key server to henceforth release a new said conversation key based on whether said conversation has a said joining participant or a said departing participant.

16. A method for securely communicating a message between a plurality of participants in a network, wherein the participant sending the message is a source participant and the participants receiving the message are destination participants and the message has a message header and a message content, the method comprising:
(a) at the source participant:
(1) obtaining a conversation key;
(2) applying protection to the message content of the message based on said conversation key, wherein said protection includes at least one member of the set consisting of encrypting and hashing; and
(3) sending the message to the destination participants via the network; and
(b) at the destination participants:
(1) receiving the message from the source participant via the network;
(2) obtaining said conversation key from a key server also in the network; and
(3) processing the message content of the message based on said conversation key, wherein said procesing includes at least one of decrypting and hash analysis.

17. The method of claim 16, wherein said conversation key is created at said key server, and communicated to the source participant in said step (a)(1).

18. The method of claim 17, wherein a plurality of said conversation keys are created at said key server and communicated to the source participant concurrently, thereby avoiding having to ask said key server to release a said conversation key every time one is desired.

19. The method of claim 16, wherein said conversation key is created at the source participant, and communicated to said key server before said step (b)(2).

20. The method of claim 19, wherein a plurality of said conversation keys are created at the source participant and communicated to said key server concurrently, thereby avoiding having to ask the source participant to provide a said conversation key every time one is desired.

21. The method of claim 19, further comprising:
before said step (a)(1), associating a unique identifier with said conversation key at said key server; and
contemporaneous with said step (b)(2) for each of the destination participants, releasing said conversation key to the respective destination participant based on said unique identifier.

22. The method of claim 19, further comprising:
before said step (a)(3), protecting the message header of the message based on a header key;
after said step (a)(3), before said step (b)(1), and at a message router also in the network:
receiving the message;
processing the message header based on said header key;
protecting the message header based on a different said header key; and
sending the message onward to the destination participants via the network; and
after said step (b)(1), processing the message header of the message based on said different said header key.

23. The method of claim 22, wherein at least one of said header keys are based on a member of the set consisting of secure socket layer and transport layer security.

24. The method of claim 22, wherein all said header keys are different for each of the participants.

25. The method of claim 24, wherein a conversation is an exchange of a plurality of topically related instances of the messages and a conversation participant is a member of the set of the participants participating in said conversation, and the method further comprising:
maintaining at least one persistent connection with said message router for the duration of each session in which a said conversation participant participates in a said conversation; and
employing a different said header key for each said session.

26. The method of claim 19, wherein:
said step (a)(1) and said step (b)(2) include the participants requesting said conversation key from said key server via a message router also in the network.

27. The method of claim 26, wherein an instance of the message requesting a said conversation key is a key request message, and the method further comprising:
said message router determining whether to communicate said key request message to said key server based on the message header of said key request message.

28. The method of claim 26, wherein a conversation is an exchange of a plurality of topically related instances of the messages and a conversation participant is a member of the set of the participants participating in said conversation, a joining participant is a potential said conversation participant seeking to participate in said conversation, and a departing participant is an existing said conversation participant seeking to no longer participate in said conversation, and the method further comprising:
said message router instructing said key server to henceforth release a new said conversation key based on whether said conversation has a said joining participant or a said departing participant.

* * * * *